US006810849B1

(12) United States Patent
Hirsch et al.

(10) Patent No.: US 6,810,849 B1
(45) Date of Patent: Nov. 2, 2004

(54) FOUR-STROKE INTERNAL COMBUSTION ENGINE

(75) Inventors: Nicholas Robert Hirsch, Pewaukee, WI (US); Mark Donald Schaefer, Waukesha, WI (US); Michael Paul Braun, Wauwatosa, WI (US); Peter Hotz, Whitefish Bay, WI (US); Darrell Albert Wiatrowski, Beach Park, IL (US); Ronald Lee Bartelt, Muskego, WI (US); Brian Hubbard, East Troy, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 09/600,096

(22) PCT Filed: Jan. 13, 2000

(86) PCT No.: PCT/US00/00841

§ 371 (c)(1),
(2), (4) Date: Jun. 7, 2001

(87) PCT Pub. No.: WO00/43655

PCT Pub. Date: Jul. 27, 2000

Related U.S. Application Data

(60) Provisional application No. 60/117,215, filed on Jan. 25, 1999.

(51) Int. Cl.$^7$ .................................. F02N 1/00
(52) U.S. Cl. .................. 123/185.3; 123/196 R; 123/311; 123/41.56
(58) Field of Search .................. 123/196 R, 195 R, 123/41.56, 196 W, 196 CP, 311, 185.3

(56) References Cited

U.S. PATENT DOCUMENTS

| 1,073,092 A | 9/1913 | Christensen |
| 1,878,224 A | 9/1932 | Woolson |

(List continued on next page.)

FOREIGN PATENT DOCUMENTS

| AU | 199881968 B2 | 10/1998 |
| CA | 949.627 | 6/1974 |

(List continued on next page.)

OTHER PUBLICATIONS

FS–91SII–P, Four Cycle Engine Owner's Instruction Manual, O.S. Engines Mfg. Co. Ltd., 1997, pp. 1–22.

Primary Examiner—Tony M. Argenbright
Assistant Examiner—Katrina B. Harris
(74) Attorney, Agent, or Firm—Michael Best & Friedrich LLP

(57) ABSTRACT

A four-stroke internal combustion engine is provided that is capable of use in many power tools, including those power tools subjected to tippable applications. There is provided within an engine housing an oil reservoir and a valve chamber which independently communicate with a crank chamber. A strategically placed divider and passageway, located within the engine housing, appropriately direct lubricant within the engine housing so that the internal cavity of the engine is lubricated during use in various operating attitudes, and so that the fluid flows to and is held in the proper chambers of the engine housing during storage. There is also provided a breather arrangement for an internal combustion engine which includes a cam shaft having a hollow passageway in communication with the crank chamber and the air intake system of the engine.

94 Claims, 26 Drawing Sheets

U.S. PATENT DOCUMENTS

| | | | |
|---|---|---|---|
| 1,944,052 A | 1/1934 | Zaschka |
| 2,400,575 A | 5/1946 | Schwartz |
| 2,440,815 A | 5/1948 | Wharam et al. |
| 2,815,834 A | 12/1957 | Mall |
| 3,022,053 A | 2/1962 | Hoyt |
| 3,561,195 A | 2/1971 | Bouru |
| 3,570,464 A | 3/1971 | Morabit |
| 3,967,595 A | 7/1976 | Yagi et al. |
| 4,103,665 A | 8/1978 | Prasch |
| 4,142,487 A | 3/1979 | Somraty |
| 4,170,203 A | 10/1979 | Congram et al. |
| 4,233,043 A | 11/1980 | Catterson |
| 4,344,561 A | 8/1982 | Iizuka et al. |
| 4,406,590 A | 9/1983 | Kessler |
| 4,483,279 A | 11/1984 | Kohler et al. |
| 4,513,702 A | 4/1985 | Koga et al. |
| 4,523,556 A | 6/1985 | Suzuki |
| 4,524,735 A | 6/1985 | Bauder |
| 4,559,686 A | 12/1985 | Kessler |
| 4,570,587 A | 2/1986 | Watanabe et al. |
| 4,582,030 A | 4/1986 | Reese |
| 4,604,067 A | 8/1986 | Roberts |
| 4,644,606 A | 2/1987 | Luerken et al. |
| 4,651,704 A | 3/1987 | Sekiguchi |
| 4,709,669 A | 12/1987 | Wissmann et al. |
| 4,798,185 A | 1/1989 | Driggers |
| 4,825,548 A | 5/1989 | Driggers |
| 4,867,007 A | 9/1989 | Krotky |
| 4,922,881 A | 5/1990 | Tamba et al. |
| 4,976,093 A | 12/1990 | Everts |
| 5,000,126 A | 3/1991 | Isaka et al. |
| 5,031,591 A | 7/1991 | Shinoda et al. |
| 5,241,932 A | 9/1993 | Everts |
| 5,243,937 A | 9/1993 | Imagawa |
| 5,341,781 A | 8/1994 | Gerhardt |
| 5,429,095 A | 7/1995 | Aodai et al. |
| 5,467,843 A | 11/1995 | Esch et al. |
| 5,485,666 A | 1/1996 | Welborn et al. |
| 5,558,057 A | 9/1996 | Everts |
| 5,600,195 A | 2/1997 | Welborn et al. |
| 5,660,152 A | 8/1997 | Masuda |
| 5,690,084 A | 11/1997 | Gunji et al. |
| 5,730,044 A | 3/1998 | Oh |
| 5,738,062 A | 4/1998 | Everts |
| 5,857,439 A | 1/1999 | Will et al. |
| 5,887,563 A | 3/1999 | Shudo et al. |
| 5,901,687 A | 5/1999 | Tasaki et al. |
| 5,937,836 A | 8/1999 | Yonezawa et al. |
| 5,947,075 A | 9/1999 | Ryu et al. |
| 5,950,578 A | 9/1999 | Hirano et al. |
| 5,950,590 A | 9/1999 | Everts et al. |
| 6,394,060 B2 * | 5/2002 | Nagai et al. ............ 123/196 R |

FOREIGN PATENT DOCUMENTS

| | | |
|---|---|---|
| DE | 3335962 A1 | 2/1985 |
| DE | 4142875 A1 | 2/1992 |
| DE | 197 29 946 A 1 | 1/1999 |
| EP | 0 279 446 | 8/1988 |
| EP | 0 211 156 | 10/1989 |
| EP | 0 428 187 | 5/1991 |
| EP | 0 197 487 | 7/1992 |
| EP | 0 509 738 A1 | 10/1992 |
| EP | 0 279 445 | 9/1993 |
| EP | 0 428 186 | 1/1995 |
| EP | 0 779 412 | 6/1997 |
| EP | 0779412 A2 | 6/1997 |
| EP | 0 715 688 | 2/1998 |
| EP | 0 631 040 | 3/1998 |
| EP | 0835987 A2 | 4/1998 |
| EP | 0 839 992 | 5/1998 |
| EP | 0 887 520 | 12/1998 |
| EP | 1 092 844 A2 | 4/2001 |
| GB | 315718 | 7/1929 |
| GB | 714619 | 9/1954 |
| JP | 2769984 | 7/1996 |
| JP | 10288019 A | 4/1997 |
| WO | WO 99/02824 A1 | 1/1999 |
| WO | WO 99/09304 | 2/1999 |

* cited by examiner

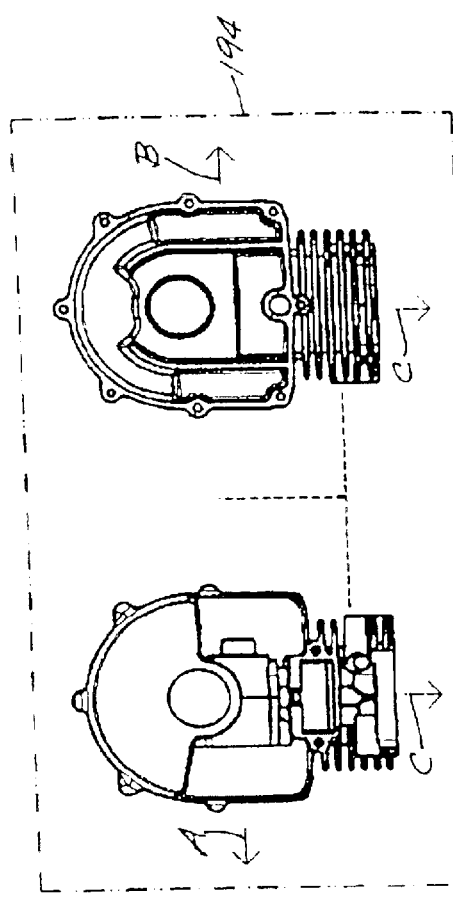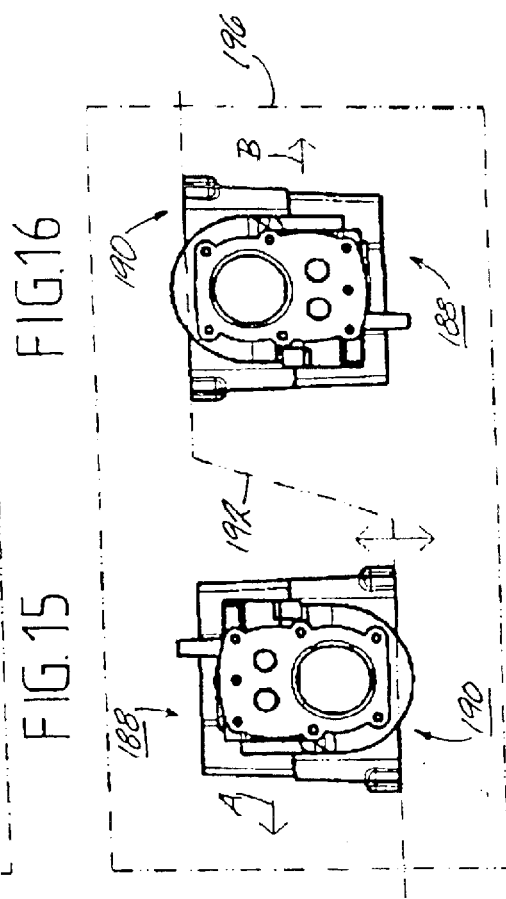
FIG.15  FIG.16  FIG.17  FIG.18

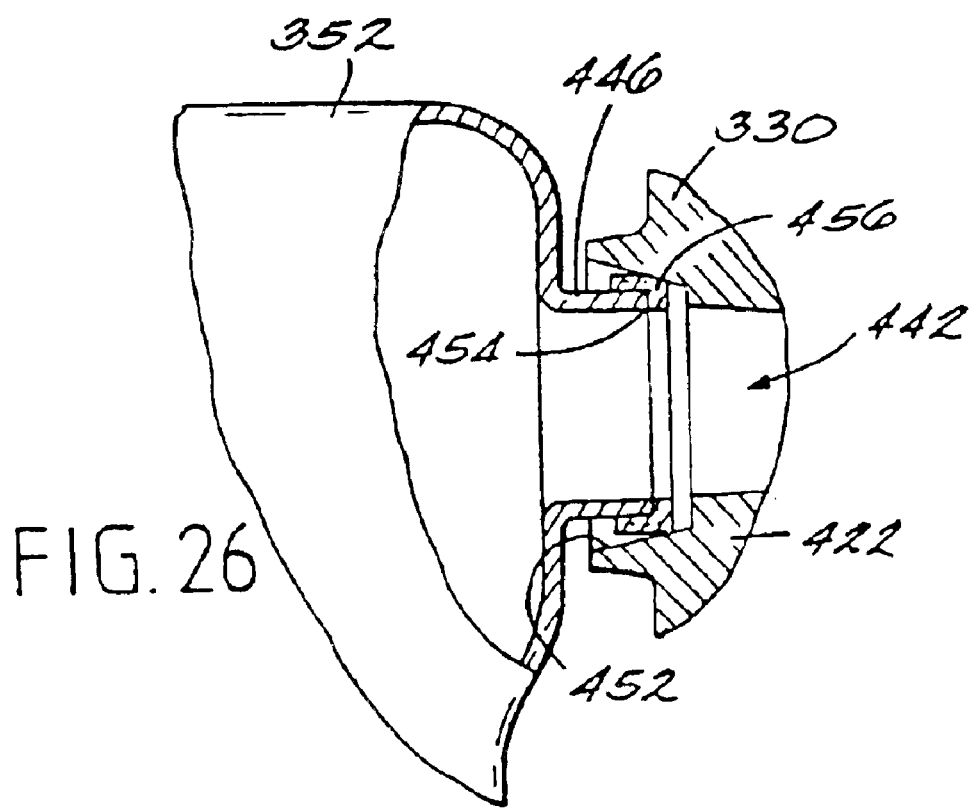

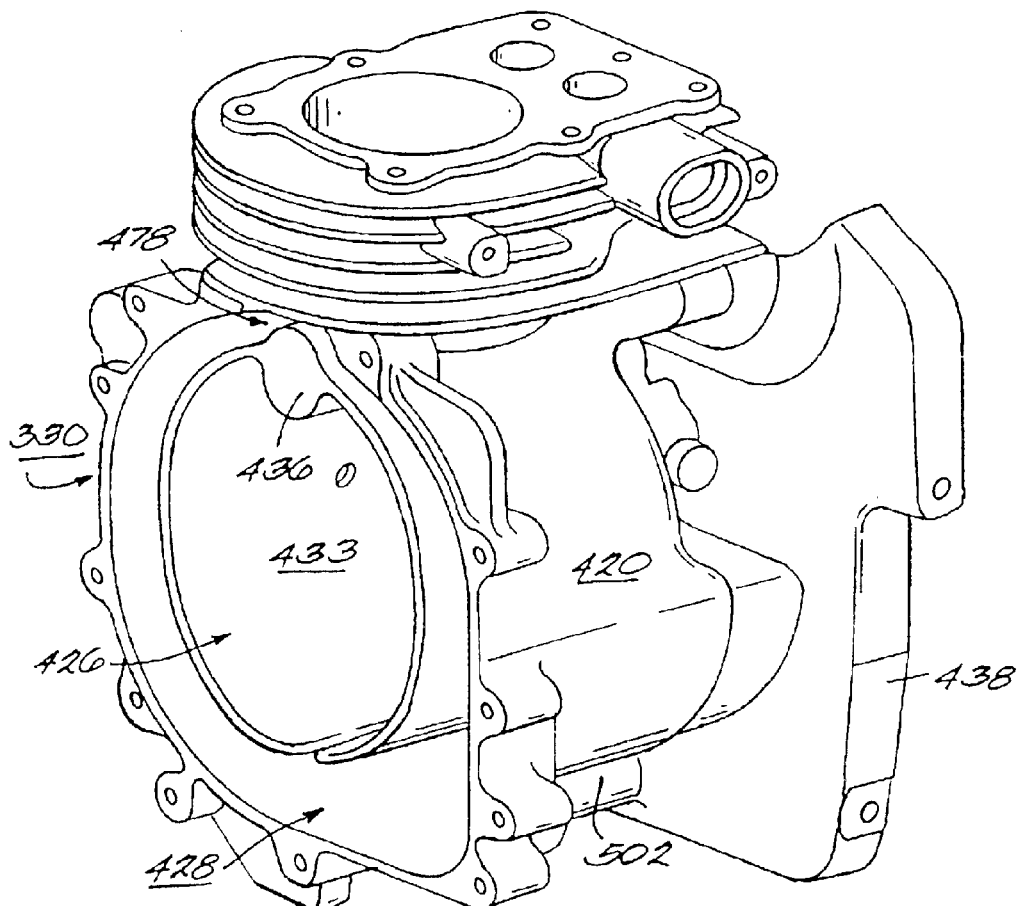
FIG. 28
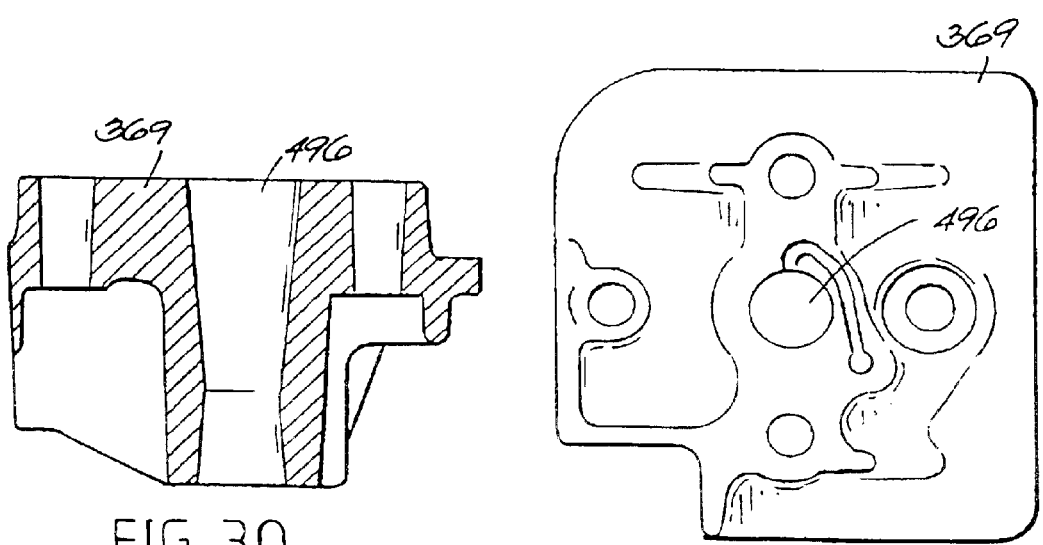
FIG. 30
FIG. 29

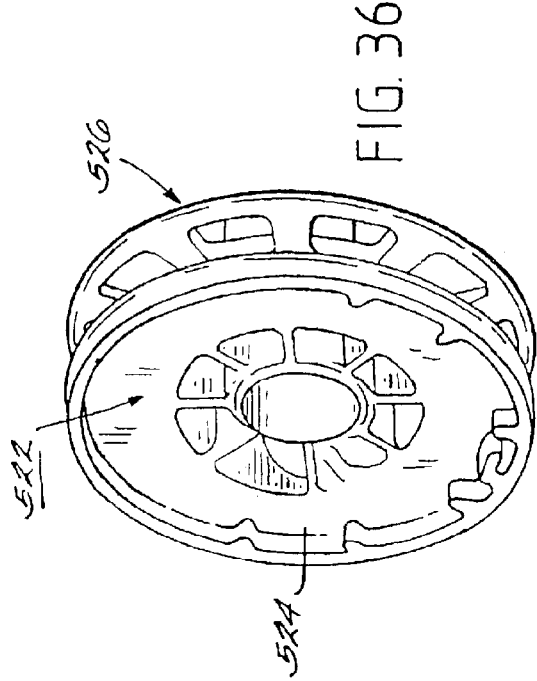
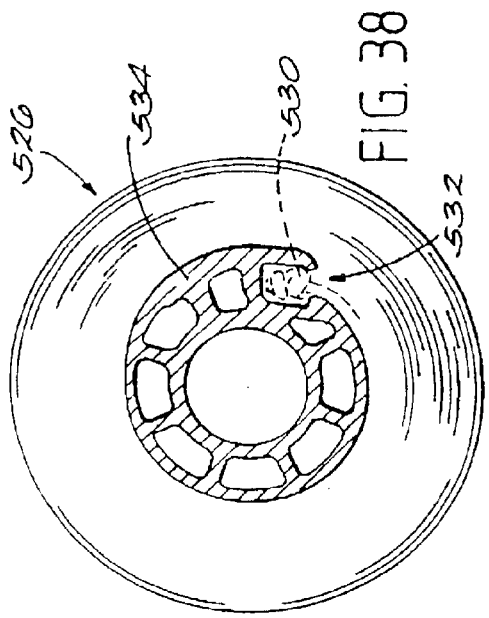
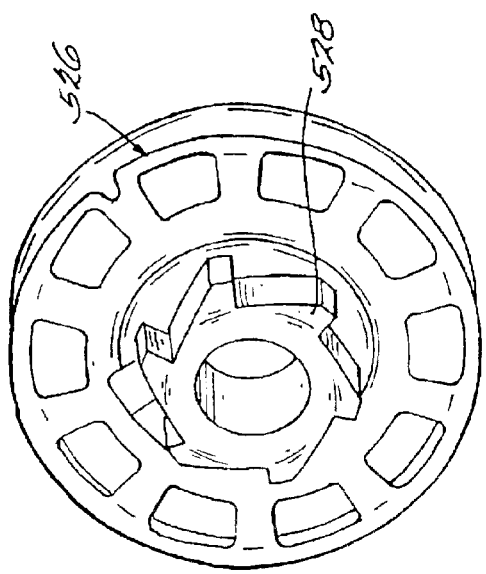
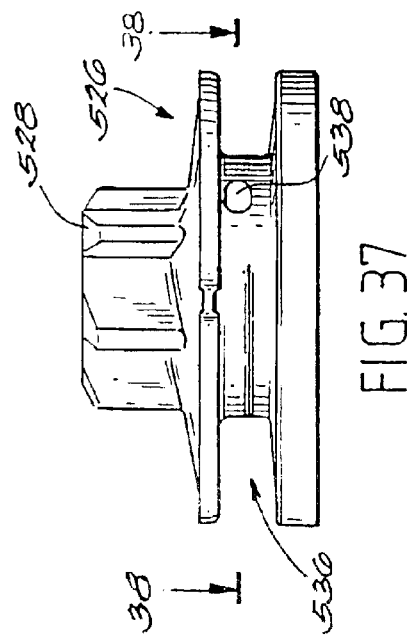

FOUR-STROKE INTERNAL COMBUSTION ENGINE

CROSS-REFERENCE TO RELATED APPLICATION

This application is a 371 PCT/US/00/00841 filed Jan. 13, 2000, which claims the benefit of U.S. Provisional Application No. 60/117,215, filed Jan. 25, 1999.

FIELD OF THE INVENTION

The present invention relates, generally, to four-stroke internal combustion engines and, more particularly, to four-stroke internal combustion engines used in trimmers, blowers, vacuums, chain saws, other hand-held power tools, snowblowers, generators, vegetation cutting devices such as lawn mowers, or other outdoor power equipment.

BACKGROUND OF THE INVENTION

Many hand-held power tools or other outdoor power equipment are powered by electric motors or two-stroke internal combustion engines. Electric motors are limited to certain applications due to the available power for products utilizing a cord, and battery longevity for cordless products. Conventional two-stroke engines include a lubricating means in which the lubricant is mixed with fuel which allows the engines to operate in any given position such as upright, inclined, sideways or upside down. For example, when using a chain saw, the chain saw is typically capable of use in either an upright, sideways or upside down condition. Over the past few years, there has been a requirement by various governing bodies to reduce the emissions associated with all small gas engines, particularly, conventional two-stroke engines. Thus, because four-stroke engines do not require the mixing of lubricant and fuel, it is desirable to use four-stroke engines in place of conventional two-stroke engines, since four-stroke engines normally release fewer undesirable emissions as compared to the amount of undesirable emissions released by conventional two-stroke engines.

However, previously, it was widely viewed that four-stroke internal combustion engines could only be used for limited applications, such as lawn mowers, snowblowers, generators, or other portable products having wheels. It was thought that these prior four-stroke engines were too heavy and cumbersome to be used in operator-carried power tools. Moreover, since it is generally necessary to store oil separate from the gas so that the oil can be used for lubrication, traditional low-cost four-stroke engines were not designed to operate in any position other than a substantially upright position because if the engine was significantly tipped or tilted, the lubricant would foul the engine. Only very recently has it been contemplated that a four-stroke engine may be used in a hand-held power tool or in other applications where the engine may operate in a tipped or tilted condition.

SUMMARY OF THE INVENTION

Accordingly, there is a need for a four-stroke internal combustion engine that is capable of use in various power tools, and yet is also capable of having low emissions and being sufficiently light to be carried by an operator when desired. What is also needed is a four-stroke internal combustion engine that is capable of operating in many different attitudes of the engine. What is also needed is a four-stroke engine that eliminates the need for an elaborate lubrication system. What is needed is a four-stroke internal combustion engine which accomplishes these features and other features and which is also economical to manufacture.

In one embodiment of the present invention, there is provided a four-stroke internal combustion engine, preferably a side valve or "L" head engine, having an engine housing which includes a crankcase and a cylinder. A cylinder head which at least partially defines a combustion chamber is positioned adjacent to the cylinder. An intake valve and an exhaust valve are disposed within the engine housing. A crank chamber and an oil reservoir are disposed within the crankcase in such a way that the oil reservoir is in fluid flow communication with the crank chamber. A strategically placed agitator, located at least partially within the crank chamber, moves lubricant within the engine housing during operation of the engine to lubricate the necessary components of the engine.

A divider is disposed within the crankcase to at least partially divide the crank chamber and the oil reservoir. The divider assists in directing the lubricant during operation and storage of the engine in order to prevent a substantial amount of lubricant from undesirably migrating into the combustion chamber when the engine is operated or stored in an upright or tilted position. In one aspect of the present invention, the divider defines a path which extends about the divider. The path allows lubricant in the oil reservoir to flow around a substantial portion of the divider to further enhance the lubricating and storage features of the engine according to the principles of the present invention.

The engine is constructed of light weight material and appropriately sized so that the engine is sufficiently light enough to be usable in hand-held power tools. Thus, the four-stroke internal combustion engine according to the present invention may be utilized in those applications which are traditionally limited to the use of two-stroke internal combustion engines.

In one aspect of the present invention, the divider includes at least one opening such that the crank chamber and the oil reservoir are in fluid flow communication through the opening. The opening helps ensure that the crank chamber is substantially continuously lubricated during operation of the engine, even if the engine is operated under a tilted condition. The opening in the divider is positioned such that at least some of the lubricant found in the crank chamber after operation of the engine may flow back into the oil reservoir even if the engine is stored in a tilted state. Preferably, the divider includes a plurality of openings.

In another aspect of the present invention, the engine housing further includes a cylinder side wall which at least partially extends into the crank chamber to define a lubricant receiving space between the divider and the cylinder side wall. Preferably, the cylinder side wall at least partially defines a piston bore. During operation, as the agitator mixes and slings lubricant around the inside cavity of the engine as a result of the rotating action of the agitator, the lubricant is more likely to be slung into the open area between the divider and the cylinder side wall rather than into the piston bore. Moreover, during storage, the open area or lubricant receiving space provides additional space for the lubricant to be held if the engine is stored in a sideways or upside down position to also prevent a substantial amount of the lubricant from flowing into the piston bore. As previously noted, migration of the lubricant into the combustion chamber leads to an unwanted condition. A function of the lubricant receiving space is to inhibit lubricant from reaching the piston bore, thereby preventing a substantial amount of lubricant from reaching the combustion chamber.

In another aspect of the present invention, the engine housing further includes a valve chamber. The intake valve and exhaust valve are disposed within the valve chamber and the valve chamber is in fluid flow communication with the crank chamber. The operation of the agitator, the pressure pulses created within the engine during operation of the engine, the communication of the oil reservoir with the crank chamber, and the communication of the crank chamber with the valve chamber together allow the working components found within the valve chamber to be lubricated, even if the engine is operated in a tilted manner. Preferably, the valve chamber is also in fluid flow communication with the cylinder side wall to further enhance the lubrication of the working components located within the valve chamber. The strategic positioning of the fluid flow openings into the valve chamber will prevent the valve chamber from receiving too large of a quantity of lubricant when the engine is being operated or being stored.

In another embodiment of the present invention, the engine includes a cantilevered crankshaft which has opposite ends and which is substantially located within the crank chamber. The agitator includes a counterweight which is interconnected to the cantilevered end of the crankshaft. The counterweight is adapted to reduce windage resistance on the crankshaft and to sling lubricant about the crank chamber as the crankshaft rotates during operation of the engine. Further, the counterweight throws the lubricant away from the main bearings of the crankshaft, thereby substantially preventing the main bearings from being flooded by the lubricant during operation of the engine. The divider may be provided with a scraper which is used to limit the amount of lubricant which comes into contact with the agitator or the counterweight. The scraper preferably at least partially extends into the crank chamber, so that as the agitator rotates past the scraper during operation of the engine, the scraper meters the amount of lubricant which comes into contact with the agitator.

In another aspect of the present invention, a cam shaft disposed substantially normal to the crankshaft is rotatably driven by the crankshaft. The substantially normal arrangement of the cam shaft and crankshaft enables the engine to be longer in a direction parallel to a power take off, as compared to a conventional engine in which the cam shaft is parallel with the crankshaft. Such an engine is desirable in certain hand-held power tool applications, such as power trimmers, in order to provide an overall better balance of the power tool for the convenience of the user. The substantially normal arrangement of the shafts also allows for an intake port and an exhaust port disposed in the cylinder to be significantly spaced apart. Segregating the ports will reduce heat migration from the exhaust port to the intake port which could result in hot restart (e.g., vapor lock) problems.

Preferably, the intake and exhaust ports are elliptical in shape. The elliptical configuration of the ports enables the overall profile or height of the engine housing to be reduced, thereby reducing the amount of material needed for the overall engine housing. This helps reduce the overall weight of the engine housing. The port walls are provided with sufficient surface area and strength to support the portion of the engine housing and cylinder head disposed above the ports. The substantially normal relationship between the crankshaft and the cam shaft also allows the valves to be disposed substantially normal to the crankshaft. A first valve tappet associated with the intake valve and a second valve tappet associated with the exhaust valve operatively engage the cam shaft to provide for the proper operation of the valves with respect to a four-stroke internal combustion engine. Such a compact arrangement further limits the overall weight of the engine.

In another embodiment of the present invention, a breather arrangement for the four-stroke internal combustion engine is provided. The cam shaft is provided with an axial passageway and several radial apertures. The radial apertures communicate with the crank chamber and the passageway. A breather tube communicates with the passageway and an air intake system of the engine. A check-valve is positioned between the end of the cam shaft and the air intake system to maintain the negative pressure created within the engine. Blow-by gas inside the engine is admitted into the radial aperture of the cam shaft and is sent through the axial passageway of the cam shaft and into the breather tube, so that the blow-by gas is recirculated within the engine. The pressure pulses created within the engine cause the blow-by gas to enter the cam shaft and be recirculated as described. However, the centrifugal action of the cam shaft counters the action created by the pressure pulses, thereby substantially preventing the heavier lubricant, as compared to the blow-by gas, from entering the radial apertures in the cam shaft. As a result, the lubricant will substantially remain within the cavity of the engine and will not travel through the breather tube to the air intake system of the engine.

In another aspect of the present invention, the engine housing is designed to cooperate with a piston found within the piston bore such that a connecting rod can be conveniently attached to the piston and the crankshaft. The crankcase and the piston each include an access hole. A connecting rod is operatively attached to the crankshaft and the piston in the following manner. The access hole in the crankcase and the access hole or aperture in the piston are aligned during installation of a wrist pin. The wrist pin is inserted into the piston aperture and through an end of the connecting rod to connect the connecting rod to the piston. A star washer is used to hold the wrist pin in place after instillation.

The compact size of the engine according to the present invention and the cantilevered crankshaft make it difficult to assemble the internal components of the engine, such as the piston-connecting rod-crankshaft assembly. The cooperation of the access holes in the crankcase and the piston allow for easy assembly of the piston-connecting rod-crankshaft assembly. Preferably, it is desirable to use the same engine housing casting for engines having different horsepower ratings, simply by changing the connecting rod and thus, the length of the piston throw. To facilitate assembly and to permit the same engine housing casting to be used for different sized engines, an elliptical, or the like, wrist pin boss is formed in the crankcase of the engine housing. The wrist pin boss can be machined at its upper end to provide an access hole in the crankcase for a first horsepower rating or piston throw, and the wrist pin boss can be machined at its lower end to provide an access hole in the crankcase for a second horsepower rating or piston throw. After the wrist pin boss is properly machined, the wrist pin—which connects the piston to the connecting rod—is inserted through the crankcase aperture and into the piston aperture as previously explained. In this way, the same engine housing casting can be used for different sized engines.

In another aspect of the present invention, the crank chamber includes at least two bearing pockets. One of the pockets has a larger diameter than the other. Both of the bearing pockets are disposed on the same side of the internal cylinder side wall. The cantilevered crankshaft is supported by two main bearings located in the respective bearing pockets. The bearing pocket nearest the cantilevered (input)

end of the crankshaft is the larger diameter bearing pocket so that the bearing pockets can be machined in the crank chamber from the same side with a single tool thereby eliminating unnecessary tooling requirements. This provides a significant savings in capital costs and manufacturing expenses. Preferably, before assembling the crankshaft in the crank chamber, the outer bearing and then the agitator or counterweight are properly positioned around the cantilevered end of the crankshaft. The counterweight is provided with an access aperture in order to allow a tool to appropriately contact the adjacent bearing and the crankshaft. In this way, as the crankshaft is placed into the crank chamber, the bearing is not damaged and the crankshaft is properly positioned.

In another aspect of the present invention, the combustion chamber is adapted to enhance swirl of the air/fuel mixture to increase efficiency of the engine. Preferably, a spark plug is positioned closer to the exhaust valve than the intake valve to also improve engine efficiency, and reduce the likelihood of self-ignition within the engine.

In another aspect of the present invention, the engine housing is designed in such a way so as to permit two engine housings to be produced using only one die tool and one die casting machine. This also reduces capital costs and manufacturing expenses.

In another aspect of the present invention, a starter assembly is attached to the rear of the engine and is designed to utilize a crankshaft pin which is integral with the crankshaft. The crankshaft pin is the contact point for the internal rotation of the crankshaft in order to start the engine.

In another aspect of the present invention, the blower housing has an inwardly extending hub. The hub fits over the crankshaft. The starter assembly slides onto the hub. A star washer or the like is placed over the hub so as to prevent the axial movement of the starter assembly, particularly the pulley. This arrangement eliminates the need for separate mounting bosses and fasteners which are normally needed to attach the starter assembly to the blower housing and which typically block the cooling air flow by the fan.

In another aspect of the present invention, a shroud is provided to at least partially surround the engine housing. The shroud is provided with a pair of opposed channels. A fuel tank having opposed, outwardly extending shoulders is held by the shroud as the shoulders are received by the respective channels. Preferably, a filler material is positioned between each of the channels and respective shoulders so as to provide a more snug fit between the shroud and the fuel tank.

In a preferred embodiment, a fuel line includes a fuel filter attached to the end of the fuel line disposed within the fuel tank. The fuel filter acts as a weight. During operation of the engine, as the engine is tipped in different orientations, the weighted fuel line swings to the bottom of the fuel tank so that fuel is always picked up by the fuel line regardless of the orientation of the engine.

In one aspect of the present invention, the shroud includes an opening around the intake port. An intake isolator is provided having an air/fuel passageway extending therethrough. The intake isolator is mounted to the engine housing so that the air/fuel passageway of the intake isolator is aligned with the intake port. Further, the intake isolator is positioned within the opening of the shroud to substantially ensure that cooling air passing between the engine housing and the shroud cannot escape through the opening in the shroud. The intake isolator is also used to insulate the intake air/fuel mixture from the surrounding environment to the extent feasible to ensure that the air/fuel ratio remains substantially correctly calibrated. In one embodiment of the present invention, a carburetor is interconnected with the intake isolator.

In one aspect of the present invention, the shroud includes a plurality of raised portions on one side thereof. If desired, the engine can be placed on the ground to rest on the raised portions. This could be useful, for example, on a trimmer when the user desires to change the cutting line located on the end of the shaft which is spaced a significant distance from the engine.

In another aspect of the present invention, the engine housing includes a back plate which is adjacent to a flywheel. Preferably, the crankcase, the cylinder and the back plate are cast as a single component, thereby reducing manufacturing and assembly costs, and thereby limiting the overall size of the engine housing. In a preferred embodiment, the engine housing further includes at least one fin integrally formed thereto. The fin extends from the back plate and beneath the crankcase to increase the stability between the back plate and the crankcase. The fin also is adapted to help cool the engine housing, particularly, the crankcase.

In another aspect of the present invention, a muffler is connected to the engine housing. The muffler includes a boss which extends into the exhaust port. In one embodiment, the engine housing includes an angled, stepped sealing surface located in the exhaust port. The end of the muffler boss mates against the exhaust port sealing surface to substantially prevent the exhaust from undesirably escaping into the surrounding atmosphere. Preferably, a sealing gasket is positioned between the end of the boss and the exhaust port sealing surface to even better prevent the exhaust from undesirably escaping into the atmosphere. In another embodiment, the muffler boss is surrounded by a portion of the exhaust port to define a clearance between the outside liner of the boss and the adjacent surface of the exhaust port. A gasket is positioned between the muffler and the engine housing to seal the clearance space between the muffler and the engine housing so as to prevent exhaust from undesirably escaping into the atmosphere. In a preferred embodiment, the gasket is an enlarged gasket which also serves as a heat shield between the engine housing and the user.

In one aspect of the present invention, the muffler includes a pair of outer shells having a pair of mounting bolt holes extending therethrough for receiving a pair of mounting bolts. A pair of bolt receiving bores are located on opposite sides of the exhaust port in the engine housing. This arrangement ensures that the muffler will be securely attached to the engine housing in a stable manner. In a preferred embodiment, the muffler includes an inner shell sandwiched between the outer shells. The inner shell is a baffle plate adapted to reduce the amount of exhaust admitted into the atmosphere. The inner shell also includes a pair of mounting bolt holes to receive the mounting bolts. In yet another preferred embodiment, one of the outer shells includes a shoulder extending around an edge of the outer shell. The other outer shell includes a hook-shaped flange extending around an edge of the outer shell. The hook-shaped flange of the one outer shell receives the shoulder of the other outer shell upon assembly of the muffler. The assembly is such that if exhaust leaks out of the muffler, the exhaust will leak away from the engine housing so as not to substantially heat the engine housing.

In one aspect of the present invention, the four-stroke internal combustion engine includes an engine housing having an integrally formed crankcase, cylinder and flywheel back plate. The flywheel back plate includes at least one mounting boss on one side and at least one other mounting boss on an opposite side. An assembly fixture is utilized to hold the engine housing during assembly of the engine. Each mounting boss on the flywheel back plate receives a separate pin of the assembly fixture to secure the engine housing to the assembly fixture. A shroud is provided to at least partially surround the engine housing. The shroud includes at least two slots such that the slots surround the pins of the assembly fixture when the shroud is positioned around the engine. The shroud can then be firmly attached to the engine. After the shroud is attached to the engine, the pins can be removed from the mounting bosses. In this manner, the engine can be substantially completely assembled while the engine is mounted to the assembly fixture.

Accordingly, it is a principal feature of the present invention to provide a four-stroke internal combustion engine which includes a simple and inexpensive lubricating system which enables the engine to be functional in various operational attitudes.

It is a feature of the present invention to provide a four-stroke engine incorporating the foregoing features and yet also simple and easy to manufacture and assemble.

Other features and advantages of the invention will become apparent to those skilled in the art upon review of the following detailed description, claims and drawings.

BRIEF DESCRIPTION OF THE DRAWINGS

FIGS. 15–18 are schematic representations of two engine housings which are capable of being produced using one die tool and one die casting machine.

FIG. 26 is an enlarged partial cross-sectional view taken along line 26—26 of FIG. 23 illustrating a connection between the engine housing and muffler of FIG. 23.

FIG. 28 is a perspective view of the engine housing of FIG. 23 without the muffler.

FIG. 29 is a front view of an intake isolator as shown in FIG. 22 and FIG. 20.

FIG. 30 is a cross-sectional view of the intake isolator of FIG. 29.

FIGS. 34–38 illustrate various views of the starter pulley shown in FIG. 33.

Figure 1:
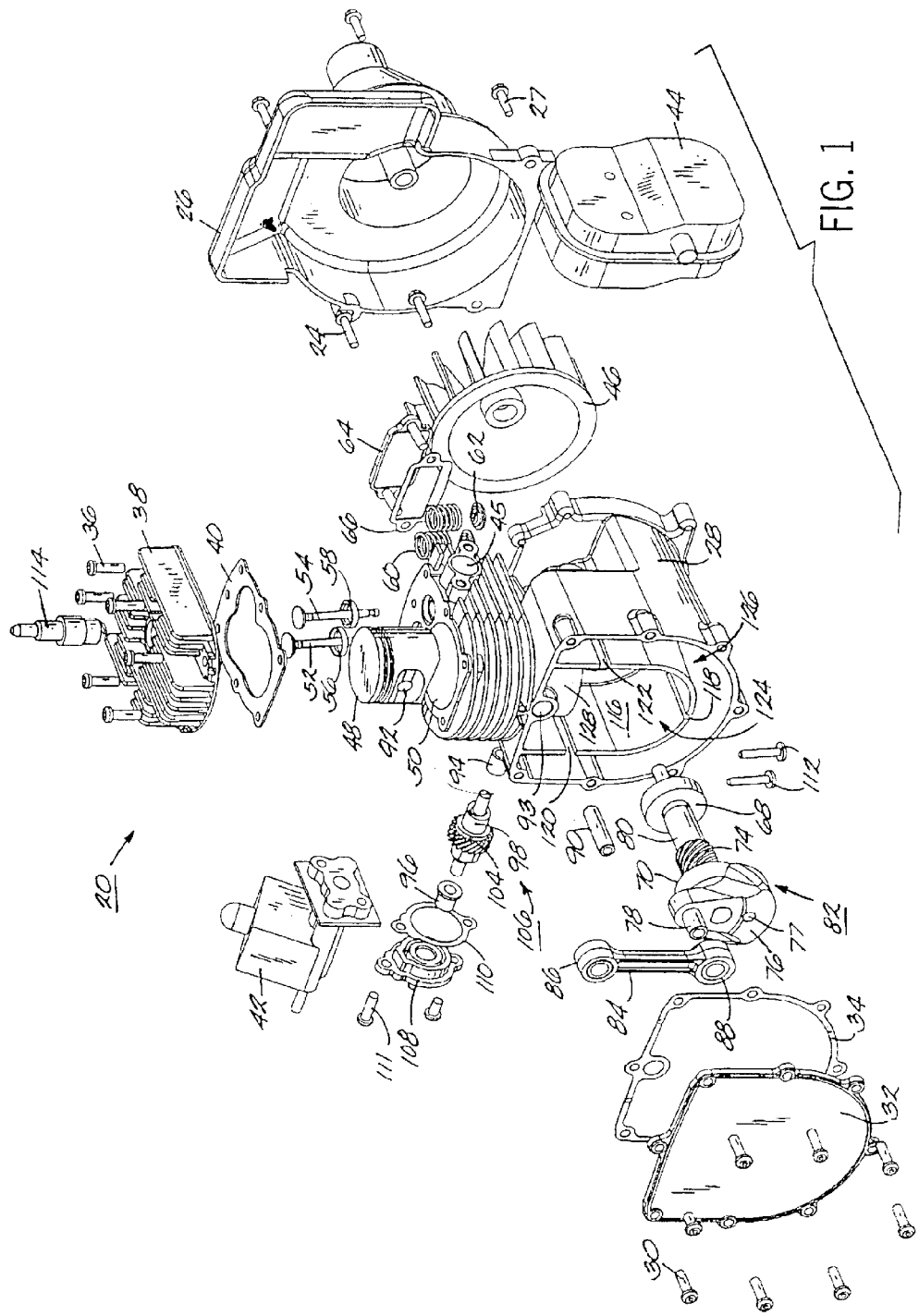
FIG. 1 is an exploded perspective view of a four-stroke internal combustion engine according to the present invention.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF THE PREFERRED EMBODIMENTS

Figure 1A:
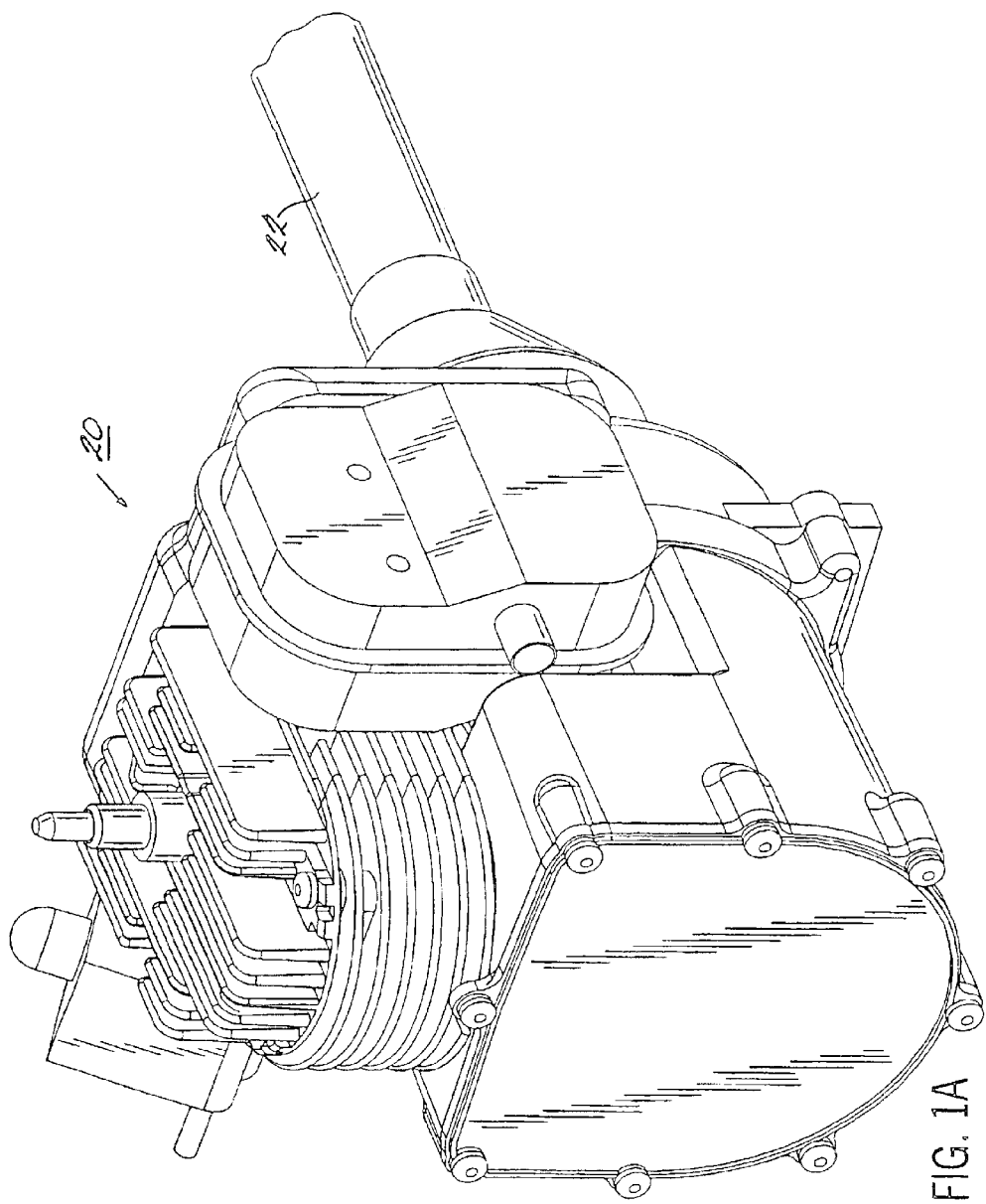
FIG. 1A is a perspective view of the four-stroke engine of FIG. 1 illustrating the engine as assembled for use with, e.g., a power trimmer.

Illustrated in FIG. 1A of the drawings is a four-stroke internal combustion engine according to the present invention. The engine 20 drives a conventional shaft typically housed in a shaft tube 22 which in turn drives an implement having a rotary head, cutting filament or blade, rotary impeller, or the like, depending on the type of power tool in use (see, e.g., FIG. 19). The shaft arrangement shown in FIG. 1A (and FIG. 19), typically used in conjunction with a hand-held power trimmer, is used for illustrative purposes only and it should be understood that other power tools such as those mentioned previously herein are capable of utilizing the four-stroke engine of the present invention. In other words, generally, the engine according to the present invention is preferably used in an orientation where the implement or working tool has an axis which is substantially parallel with a crankshaft axis. The engine according to the present invention may also be orientated with the crankshaft being horizontal or vertical. The engine according to the present invention is particularly well suited for those applications in which high RPMs, e.g., 3,000 RPMs up to 7,000–8,000 RPMs or more, may be required and in which an output of less than 1 to over 6 horsepower may be supplied. Importantly, whichever type of power tool is used in combination with the four-stroke engine according to the present invention, the engine is capable of working, at least temporarily, in substantially any operational position of the power tool.

Illustrated in FIG. 1 of the drawings is an exploded perspective view showing various components of the four-stroke internal combustion engine 20 according to the present invention. Shown in FIG. 1 is a side valve or "L" head engine in which the various features of the present invention are employed. Side valve engines are sometimes referred to as "L" head engines because of the positional relationship of an intake valve and an exhaust valve with respect to a combustion chamber. As will be apparent below, the "L" is in reference to the path taken by an air/fuel mixture and the exhaust through respective valves and ports found in the engine body. Also, importantly, in an "L" head engine, the intake valve port and the exhaust valve port are located in the engine housing, not in the cylinder head which is generally common to overhead valve or overhead cam engines.

Before describing in detail the various features of the present invention, the components shown in FIG. 1 are identified for the sake of clarity. Shown are an ignition coil screw 24 used to attach an ignition coil (not shown) to the engine 20; shroud screws 27 attach shroud 26 to an engine housing 28; cover screws 30 attach sump cover 32 and sump cover gasket 34 to the engine housing 28 in order to seal one end of the engine housing 28; cylinder head screws 36 attach cylinder head 38 and cylinder head gasket 40 to the engine housing 28 thereby at least partially defining a combustion chamber 39 (FIG. 2); carburetor 42 and muffler 44 are appropriately connected to the engine 20; carburetor 42 cooperates with intake port 41 and air cleaner or filter 43 (FIG. 2); muffler 44 cooperates with exhaust port 45; flywheel 46 which includes an integral fan (not shown) is positioned between the shroud 26 and engine housing 28 with the help of a flywheel key (not shown) in order to cool the engine 20 during operation; piston 48 is received by piston bore 50 within engine housing 28; intake valve 52 and exhaust valve 54 are positioned adjacent piston bore 50 within engine housing 28; intake valve seat 56 and exhaust valve seat 58 are placed within engine housing 28 to cooperate with the respective heads of valves 52 and 54; valve springs 60 are placed in a valve spring chamber and held within the valve spring chamber by valve spring keepers 62; the valve spring chamber is sealed by valve cover 64 and valve cover gasket 66; crankshaft bearing 68, crankshaft bearing 70, worm-helical or spiral gear 74, counterweight 76, crank pin 78 and crankshaft 80 are part of crankshaft assembly 82; counterweight 76 includes an aperture 77; connecting rod 84 includes connecting rod bearings 86 and 88; one end of connecting rod 84 fits over crank pin 78 and a wrist pin 90 connects the other end of connecting rod 84 to piston 48 by sliding in aperture 92 of piston 48; wrist pin 90 cooperates with access hole 93 of engine housing 28 when attaching the connecting rod 84 to the piston 48; cam shaft bushing 94, cam shaft bushing 96, cam shaft 98, cam lobes 100 and 102 (FIG. 2), and worm-helical or spiral gear 104 are part of cam shaft assembly 106; cam cap 108 and cam cap gasket 110 are attached to engine housing 28 by cam cap screws 111 in order to seal cam shaft assembly 106; tappets 112 are properly positioned within the engine 20 to cooperate with valves 52 and 54; spark plug 114 is positioned in a spark plug hole within cylinder head 38; divider 116 having slots 118, 120 and 122 is disposed within engine housing 28 and at least partially defines a crank chamber 124 and a lubricant or oil reservoir 126; and the piston bore 50 includes an extension 128 which at least partially extends into crank chamber 124.

Other components and features not clearly shown in FIG. 1 will be described below according to the features of the present invention.

FIG. 1 shows the carburetor 42 and the exhaust muffler 44 mounted on opposite sides of the engine housing 28. The carburetor 42 may be of any type of carburetor that is tippable such as a standard variable venturi diaphragm carburetor found in small gas engines, but a rotary valve carburetor available from, e.g., Walbro, is particularly well suited for use in an engine according to the present invention. The air cleaner or filter 43 (schematically shown in FIG. 2) is mounted in or near an inlet of an intake passage in the carburetor 42. A fuel tank (not shown in FIG. 1) is mounted typically to a lower surface of the engine housing 28 and cooperates with the carburetor 42 so that fuel and air can be supplied to the intake port 41 (FIG. 2) in the engine housing.

Figure 2:
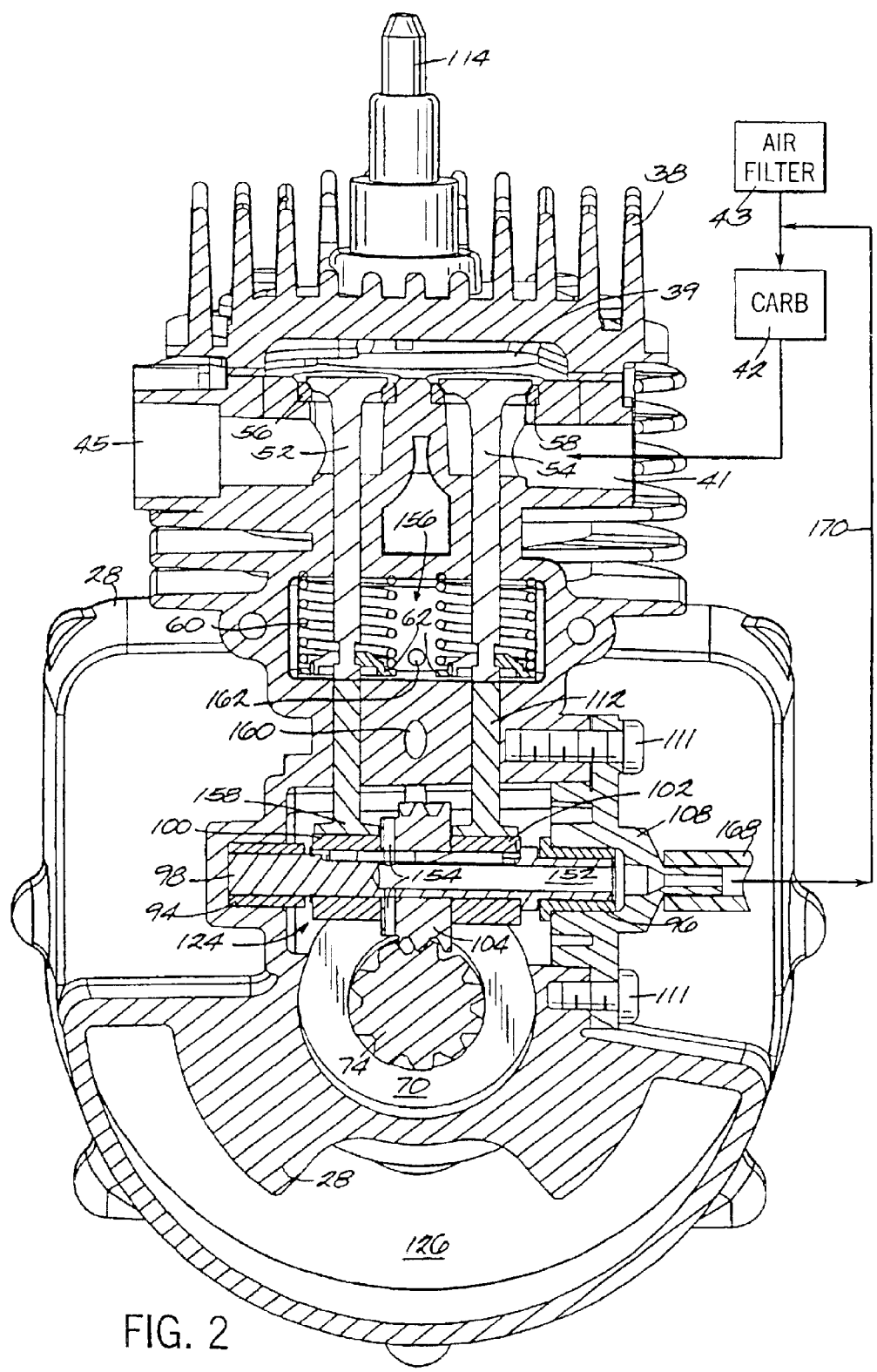
FIG. 2 is a cross-sectional end view and a partial schematic view of the engine of FIG. 1 taken along line 2—2 of FIG. 3.

The engine housing 28 is typically made of a lightweight aluminum alloy casting having a cylindrical bore or piston bore 50 formed therein. As noted, the piston bore 50 is configured to partially extend into the crank chamber 124 disposed within the engine housing 28. The area or space 136 (FIG. 13) between the extended piston bore 50 and divider 116 accepts volumes of the lubricant or oil during operation and storage to prevent too much lubricant or oil from entering the piston bore 50 or valve chamber 156 (FIG. 2). The piston 48 is preferably coated, such as with an iron coating, or chrome plated so as to eliminate the need for a sleeve such as an iron sleeve within the piston bore 50. Alternatively, piston bore 50 may include an iron cylinder sleeve.

The divider preferably includes bottom slot 118 which is located directly below the piston bore 50. Optional side slots 120 and 122 of the divider 116 may be located substantially directly across from one another at a predetermined distance from the bottom of the piston bore 50. The slots 118, 120 and 122 may be replaced with one or more holes or other apertures. As noted, the present invention is, of course, not limited to a particularly sized engine, but may be used with any internal combustion engine. The design considerations to determine the size and location of the slots or holes will be apparent below. The slots or holes should be configured for different sized engines taking into consideration the various features of the present invention.

Figure 8:
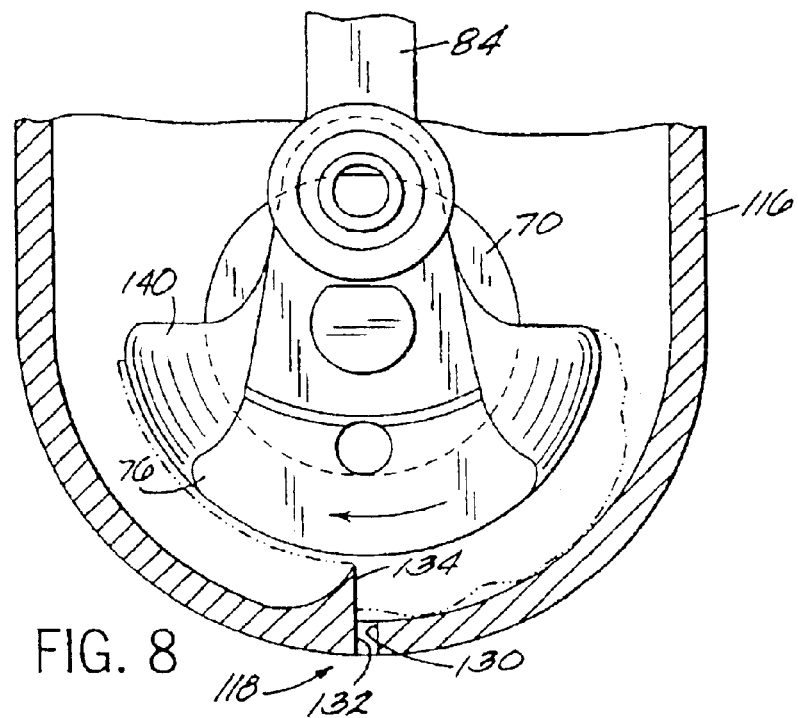
FIG. 8 is a perspective view illustrating an agitator cooperating with a scraper found on a wall within the engine cavity in order to regulate the amount of lubricant which comes into contact with the agitator.
Figure 8A:
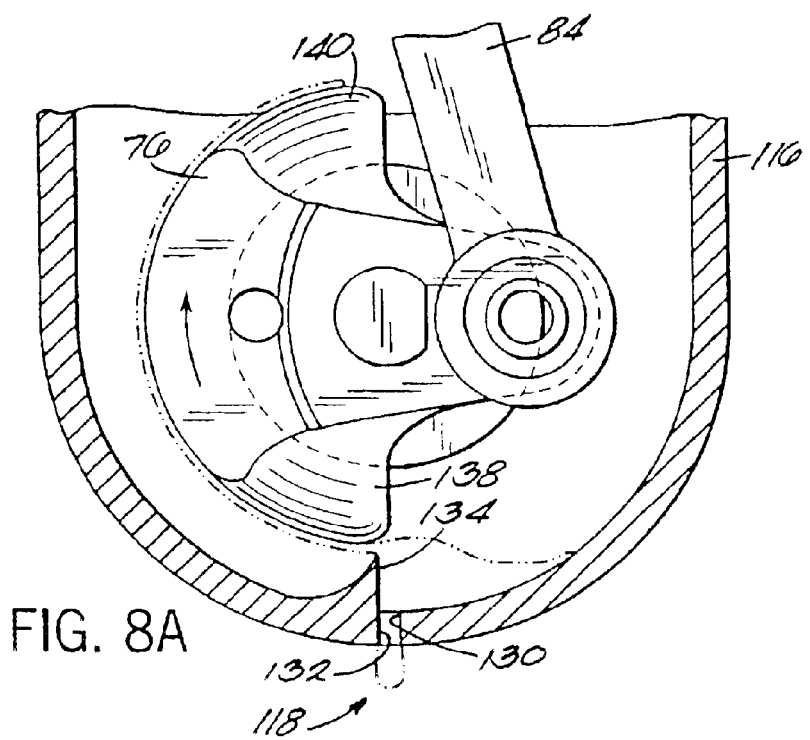
FIG. 8A shows the rotational movement of the agitator of FIG. 8 and how the scraper controls the lubricant which comes into contact with the agitator.

FIGS. 8 and 8A show another aspect of the divider 116. In operation, as shown, the counterweight 76 is caused to rotate in one direction, usually, a clockwise direction. The bottom slot 118 includes opposing sides 130 and 132. The second side 132, with respect to the direction of travel of the counterweight 76, has a scraper 134 adjacent thereto. Preferably, the scraper 134 is positioned within 0.020 to 0.060 inches of the counterweight 76 when the counterweight 76 is located closest to the scraper 134. The scraper 134 limits or meters the amount of lubricant or oil (shown in broken dotted lines) which comes into direct contact with the counterweight 76. The scraper 134 helps to limit the amount of lubricant or oil which may be slung into the piston bore 50 during operation and reduces the wind resistance caused by excessive lubricant on counterweight 76. It should be noted that the scraper 134 could be configured in other ways. For example, bottom slot 118 in the divider 116 could be a diagonal slot such that the second side of the diagonal slot acts as the scraper 134 but the scraper is not a raised scraper as shown in FIGS. 8 and 8A. Alternatively, the bottom slot 118 in the divider 116 could be a straight slot without the use of a scraper.

As noted, FIG. 1 shows the oil reservoir 126 disposed within the engine housing 28 defined by the divider 116 and the engine housing 28. The oil reservoir 126 is in fluid flow communication with the crank chamber 124, preferably through slots 118, 120 and 122. As shown, the oil reservoir 126 and the divider 116 are substantially curved or U-shaped. The divider 116 is preferably curved to direct lubricant away from the piston bore 50 when the engine is tipped or inverted. The communication between the two chambers 124 and 126 allows for the crank chamber 124 to be properly lubricated during use as the lubricant is allowed to flow between the two chambers 124 and 126 during use, and for the lubricant to flow back into the oil reservoir 126 during storage so that an excessive amount of lubricant does not adversely flow into the piston bore 50.

Figure 3:
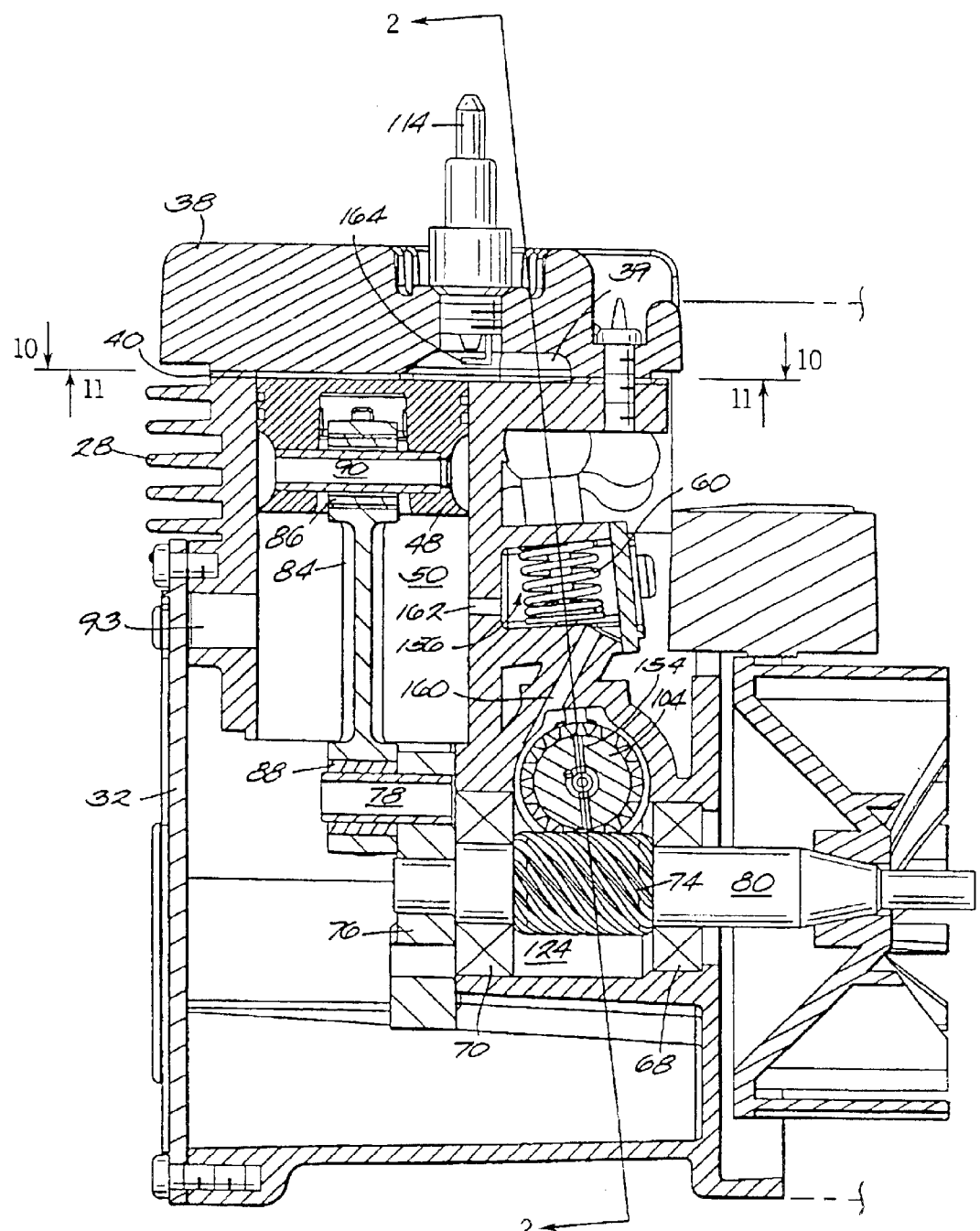
FIG. 3 is a cross-sectional side view of the assembled engine of FIG. 1.

Referring to FIGS. 1 and 3, crankshaft 80 is mounted within the crank chamber 124. The crankshaft worm-helical or spiral gear 74 drives the cam shaft assembly 106. Worm-helical or spiral gears are commonly known in the art and readily available from any number of gear manufacturers and suppliers. The crankshaft 80 and gear 74 may be manufactured in any number of known ways. However, injection molding the gear around a trim metal piece representing the crankshaft would work well according to the principles of the subject invention. The injection mold material may be a thermoplastic material or nylon material known to those skilled in the art. Another alternative is to provide a metal crankshaft with an enlarged cylindrical piece of metal on the crank where a worm-helical or spiral gear is intended to be located. The crankshaft then is subjected to a hobbing procedure in which the gear is machined on the crankshaft.

Still referring to FIGS. 1 and 3, bearings 68 and 70 are positioned around the crankshaft 80 in order to support the cantilevered crankshaft 80 when it is placed within the crank chamber 124. The bearings 68 and 70 are placed on opposite sides of the worm-helical or spiral gear 74 and on the same side of the piston bore 50. The inner bearing 68 is smaller in diameter than the outer bearing 70. The bearings 68 and 70 are dimensioned in this manner such that the bearing pockets found in the crank chamber 124 are machined from one side of the engine housing 28 using only one tool. As can be appreciated by those skilled in the art, machining bearing pockets from one direction reduces equipment, time and expense usually associated with having to machine bearing pockets from different directions.

Figure 7:
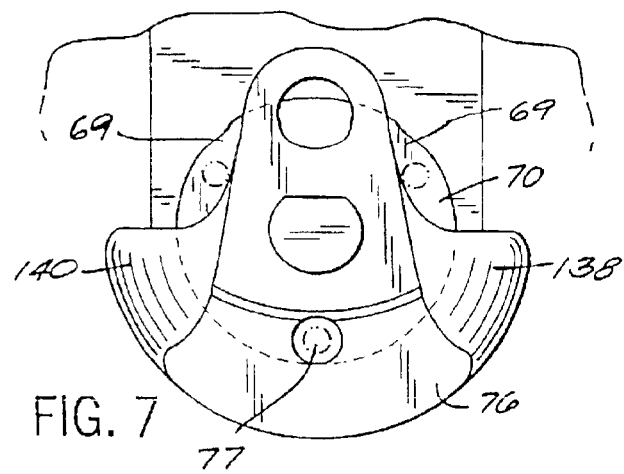
FIG. 7 is a perspective front view taken along line 7—7 of FIG. 9 illustrating a counterweight positioned adjacent to a main bearing of the crankshaft.
Figure 7A:
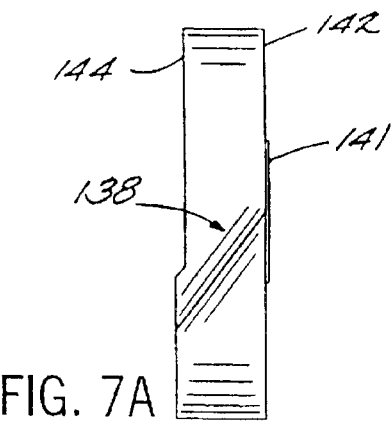
FIG. 7A is a side view of the counterweight of FIG. 7.
Figure 7B:
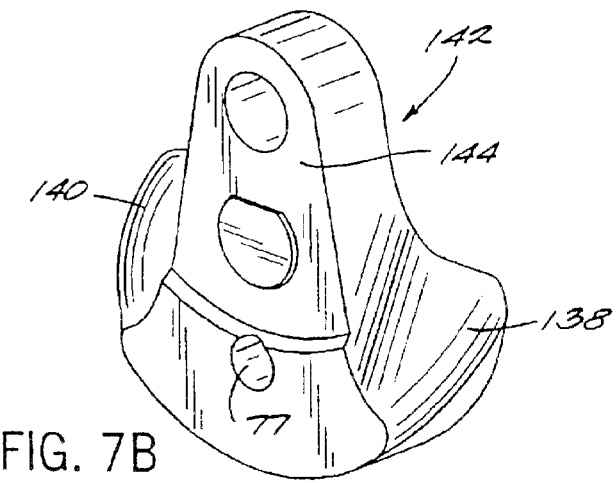
FIG. 7B is another perspective view of the counterweight of FIG. 7.

As shown in FIG. 1, counterweight 76 is mounted on one end of the crankshaft 80. FIGS. 7, 7A and 7B show in greater detail the shape and contours of the counterweight 76. As generally understood, the forces resulting from the operation of the piston 48, the connecting rod 84 and the associated components, are balanced by the counterweight 76. Depending on the size of the engine, more than one counterweight may be necessary. The counterweight 76 includes wing-tipped aerodynamic sides 138 and 140. Each wing-tipped side includes a back 142 that is positioned adjacent the main bearing 70 and a front 144 opposite the back 142. The wing-tipped sides 138 and 140 have contoured surfaces that extend from the back 140 to the front 142 of the counterweight 76. In this way, as will be more evident below, the aerodynamic shape of the counterweight 76 assists in reducing air resistance on the counterweight 76, generating the proper turbulence of air and lubricant within the internal cavity of the engine 20 and directing the lubricant within the internal cavity of the engine 20.

Figure 9:
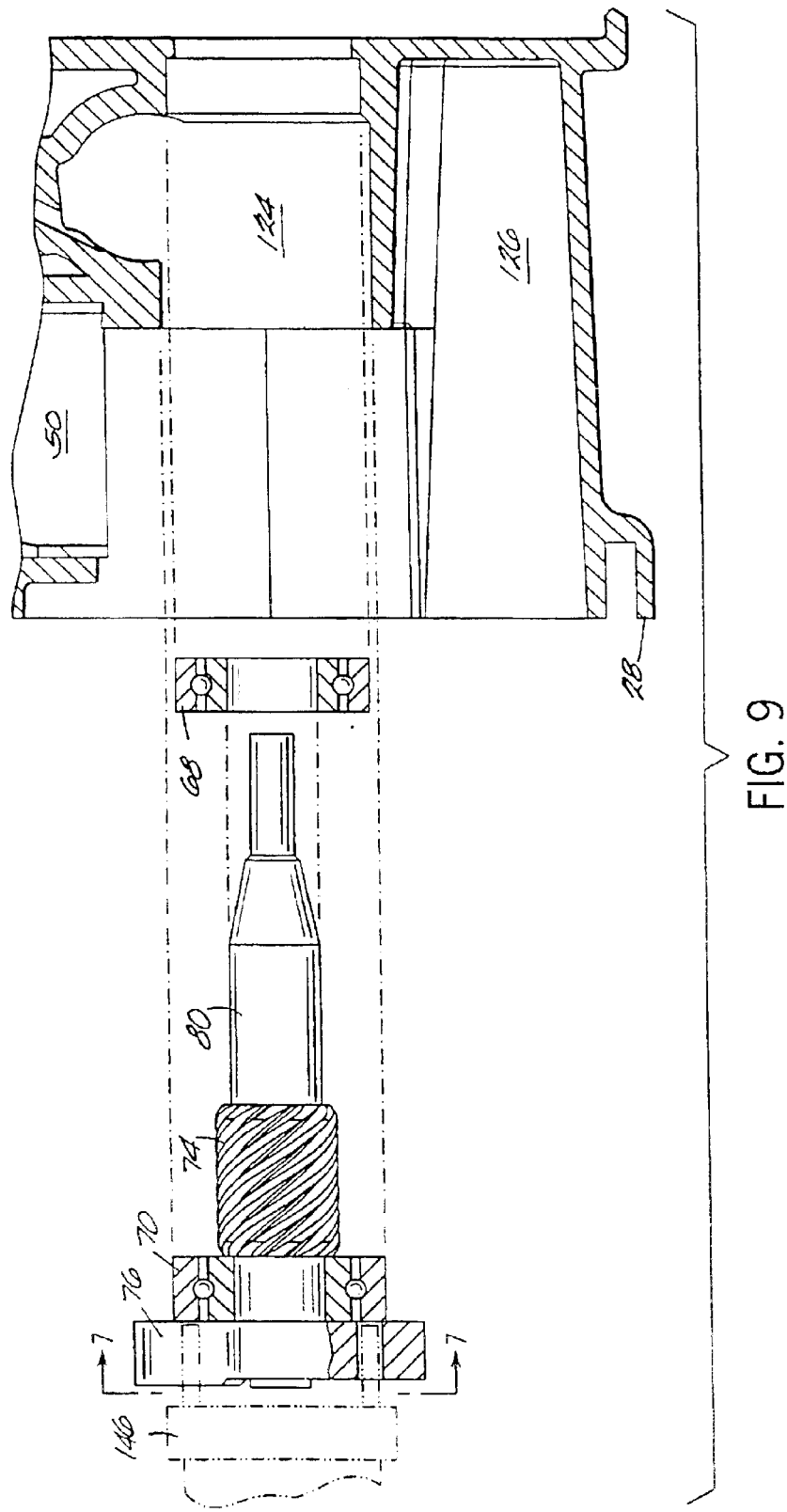
FIG. 9 is a schematic representation of another aspect of the present invention illustrating the positioning of a crankshaft within a crank chamber disposed in an engine housing.

The tool access hole or aperture 77 of counterweight 76 (FIG. 7) is used for positioning the crankshaft 80 within the crank chamber 124. FIGS. 7 and 9 schematically show a tool 146 which is used to position the outer bearing 70, counterweight 76 and the crankshaft 80 within the crank chamber 124. Bearing 68 is press fitted into the crank chamber 124 and is adapted to receive one end of the crankshaft 80. Once the crankshaft 80 has been manufactured, the bearing 70 is press fitted onto the crankshaft 80. The counterweight 76 is then fixed to the crankshaft 80. FIG. 7A illustrates a step 141 which provides a clearance of approximately 0.050 of an inch between the counterweight 76 and bearing 70. As shown in FIG. 7, only portions 69 of the outside race of the main bearing 70 are exposed after the counterweight 76 is placed on the crankshaft 80. The access aperture 77 allows the tool 146 (FIG. 9) to contact the outside race of the main bearing 70 in three spots when assembling the crankshaft 80 and associated components of the crankshaft assembly 82 into the crank chamber 124. A fourth leg of the tool (FIG. 9) contacts the cantilevered end of the crankshaft 80. This assembly helps ensure that the main bearing 70 will not be damaged upon assembly and the crankshaft 80 will be properly seated when inserted into the crank chamber 124.

Figure 5:
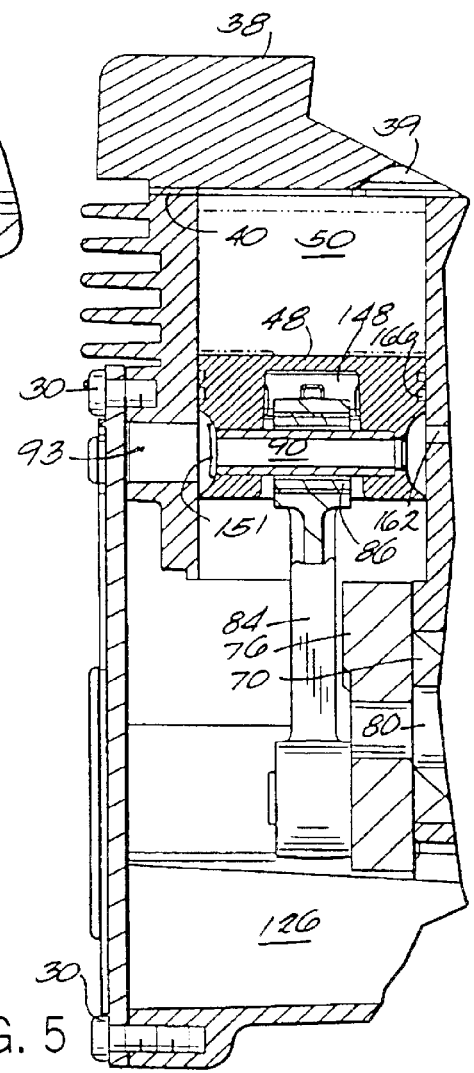
FIG. 5 is an enlarged view of a portion of the engine shown in FIG. 3 illustrating a piston in its bottom dead center position.
Figure 6:
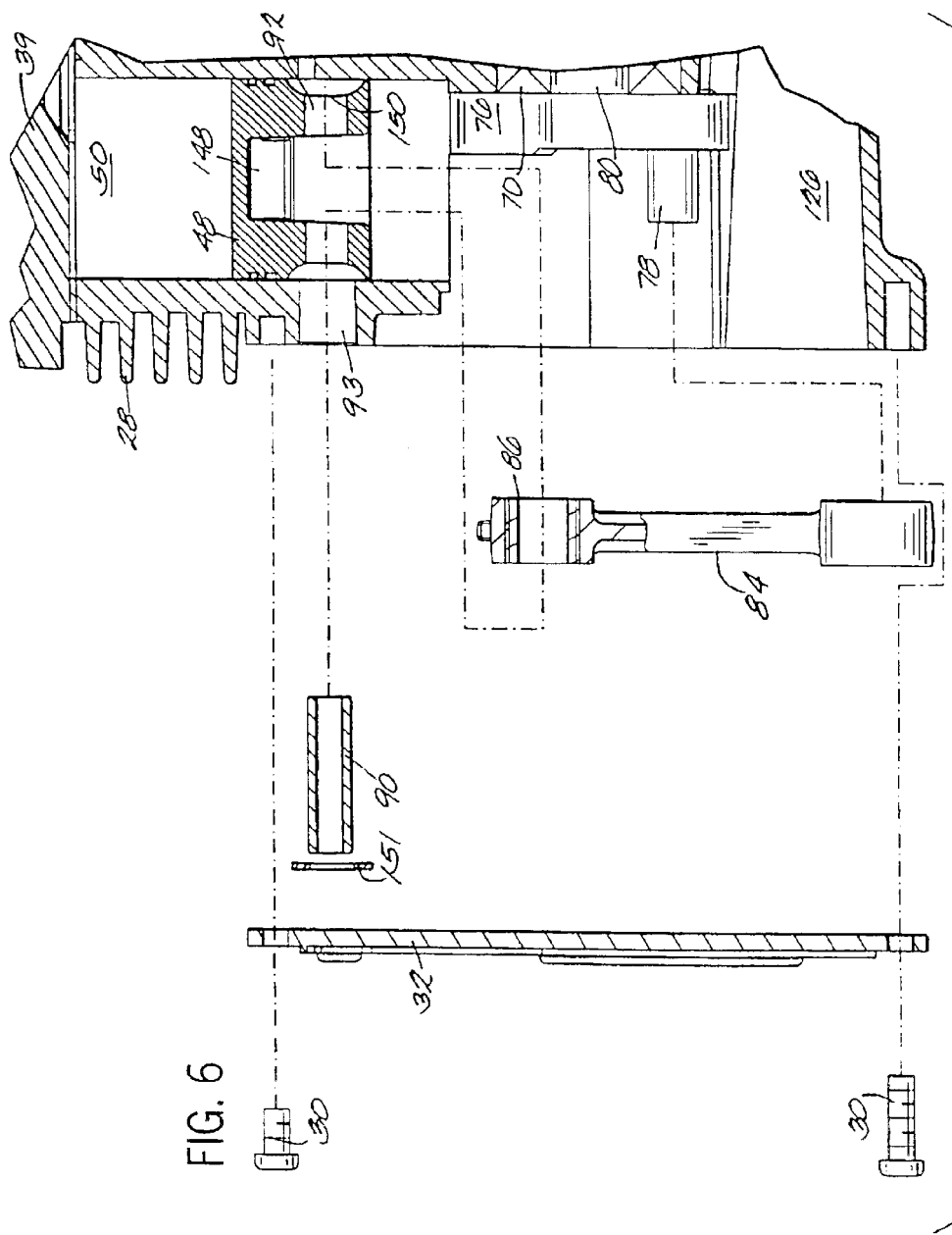
FIG. 6 is a schematic representation illustrating another aspect of the present invention which concerns the attachment of a connecting rod to a piston and a crankshaft.

FIG. 6 schematically illustrates how the connecting rod 84 is attached to the crankshaft 80 and piston 48. A custom shoulder bolt (not shown) may be utilized to affix the connecting rod 84 to the crank pin 78. The entire crankshaft assembly 82 (FIG. 1) is mounted within the crank chamber 124 (FIG. 3). The piston 48 is slid into the piston bore 50 from the top of the engine housing 28. The aperture 92 in the piston 48 is lined up with the access aperture 93 in the engine housing 28. The connecting rod 84 is attached to the crankshaft assembly 82 by virtue of crank pin 78 and positioned within a cut out portion 148 of the piston 48. The wrist pin 90 is inserted through the access hole 93 of the engine housing 28 into the access hole 92 of the piston 48 and through the bearing 86 of the connecting rod 84. Since the aperture 92 of the piston 48 is not drilled all the way through the piston 48, one end of the wrist pin 90 abuts an inner portion 150 of the piston 48. The wrist pin 90 can be held in place within the piston 48 by a star washer 151 inserted in the open end of the aperture 92 (see also FIG. 5). Preferably, the wrist pin 90 and the crank pin 78 are hollow so as to reduce the overall weight of the reciprocating mass which in turn means a smaller counterweight with less weight is needed to balance the forces generated by the reciprocating mass. Reducing the overall weight of the reciprocating components improves vibration and makes the engine lighter for ease of operation.

The cam shaft 98, the eccentric style cam lobes 100 and 102 and the cam gear 104 are shown as separate parts in FIG. 2. It should be noted that these parts can be injected molded as a single component using, for example, a thermoplastic or nylon material. Alternatively, certain components maybe injected molded around a piece of trim metal to create the final assembly in similar manner to that contemplated for the crankshaft 80 and worm-helical or spiral gear 74.

Figure 4:
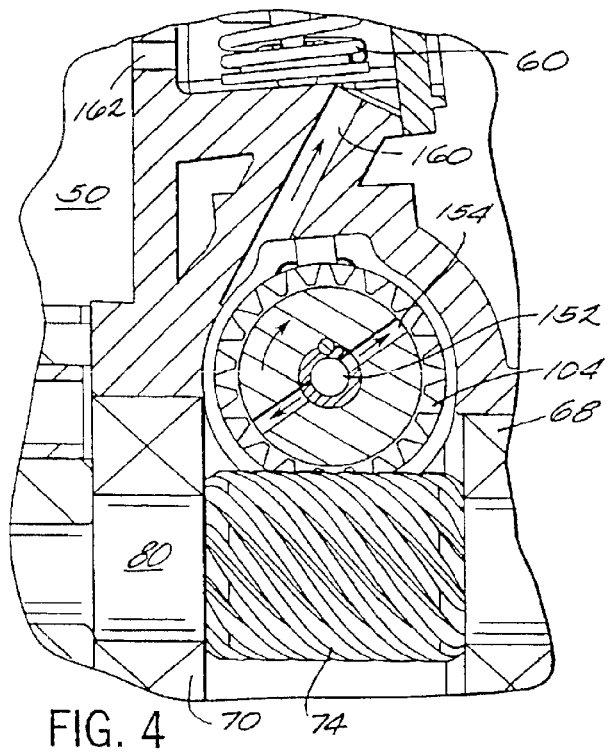
FIG. 4 is an enlarged view of a portion of the engine shown in FIG. 3 illustrating the rotational relationship between a cam gear and a crank gear, a portion of a lubricant flow path, and a portion of a breather system for the engine shown in FIG. 1.

FIG. 2 illustrates that the cam shaft 98 includes a passageway 152. FIGS. 2, 3 and 4 show that a portion of the cam shaft assembly 106 (FIG. 1) adjacent the worm-helical or spiral gear 104 includes at least one radial aperture 154 exposed to the passageway 152 and crank chamber 124. The passageway 152 and aperture 154 may be drilled into the proper portions of the cam shaft assembly 106 or molded therein. Essentially, the passageway 152 and the aperture 154 and cam shaft assembly 106 cooperate to provide a breather arrangement for the internal combustion engine which will be fully outlined below. Further, the radial aperture 154 may be found in a radial disc (not shown) attached to the cam shaft assembly 106 in close proximity to the gear 104 so as to be in communication with the passageway 152 and crank chamber 124.

As shown, the cam shaft 98 is located normal to the crankshaft 80. As can be appreciated by those skilled in the art, generally, in typical small gas engines, the cam shaft and the crankshaft are parallel to one another, not normal as shown according to the present invention. A parallel arrangement leads to a wider engine whereas the normal arrangement according to the present invention leads to a longer engine design with the crankshaft axis being substantially parallel to the longitudinal axis of the tool. A longer unit is particularly desirable for those hand-held applications such as power trimmers which require better balance for ease of operation. A wider engine may tend to cause the unit to want to rotate in the operator's hands during use.

FIG. 2 shows that cam shaft 98 sits in bushings 94 and 96 which rest in respective pockets within the crank chamber 124 in engine housing 28. The worm-helical or spiral gears 74 and 104 (FIGS. 2 and 3) are preferably designed such that when cam shaft 98 is placed generally normal to crankshaft 80, the gears 74 and 104 mesh so that the rotational relationship between the crankshaft 80 to cam shaft 98 is 2 to 1.

The tappets 112 and the intake valve 52 and the exhaust valve 54 cooperate with cam shaft 98 (FIG. 2). Intake valve 52 and exhaust valve 54 are positioned within engine housing 28 adjacent to piston 48 and piston bore 50. The valves 52 and 54 are positioned such that the valve heads are closer to the centerline of the bore 50 as compared to the lower portions of the valves (FIG. 3). Preferably, the valves 52 and 54 are set at an angle of approximately between zero and eight degrees from a line parallel with the centerline of the bore. The intake valve seat 56 and the exhaust valve seat 58 are placed within engine housing 28 and cooperate with the heads of the respective valves 52 and 54 to alternately create a seal or an opening into the combustion chamber 39 with respect to the ports 41 and 45. The valve spring keepers 62 and valve compression springs 60 are positioned within the valve chamber 156(FIG. 2). Each tappet 112 includes a respective head 158 which is in operational contact with respective cam lobes 100 and 102. As the cam shaft 98 rotates by virtue of drive gear 74, cam lobes 100 and 102 properly engage tappets 112 such that valves 52 and 54 move up and down as is commonly understood by those skilled in the art.

With reference to FIGS. 2, 3 and 4, the crank chamber 124 is in communication with the valve chamber 156 via access passageway or aperture 160. Additionally, the valve chamber 156 is in communication with the piston bore 50 via access passageway or aperture 162. The passageways 160 and 162 allow valve chamber 156 and the components therein to receive lubricant during operation of the engine 20 in substantially any attitude. Additionally, during storage, with the aid of divider 116, the extended piston bore 50, and the slots 118, 120 and 122, a significant amount of lubricant will not remain or flow into the valve chamber 156.

Referring to FIGS. 1, 2 and 3, cylinder head gasket 40 is positioned between the cylinder head 38 and the engine housing 28 so as to provide a proper seal between the two. Spark plug 114 projects into the enclosed combustion chamber 39. Spark plug 114 fires in combination with the ignition coil and magneto (not shown) to provide the necessary charge or high voltage signal to ignite the air/fuel mixture in the combustion chamber 39 when the engine 20 is in operational mode.

Figure 10:
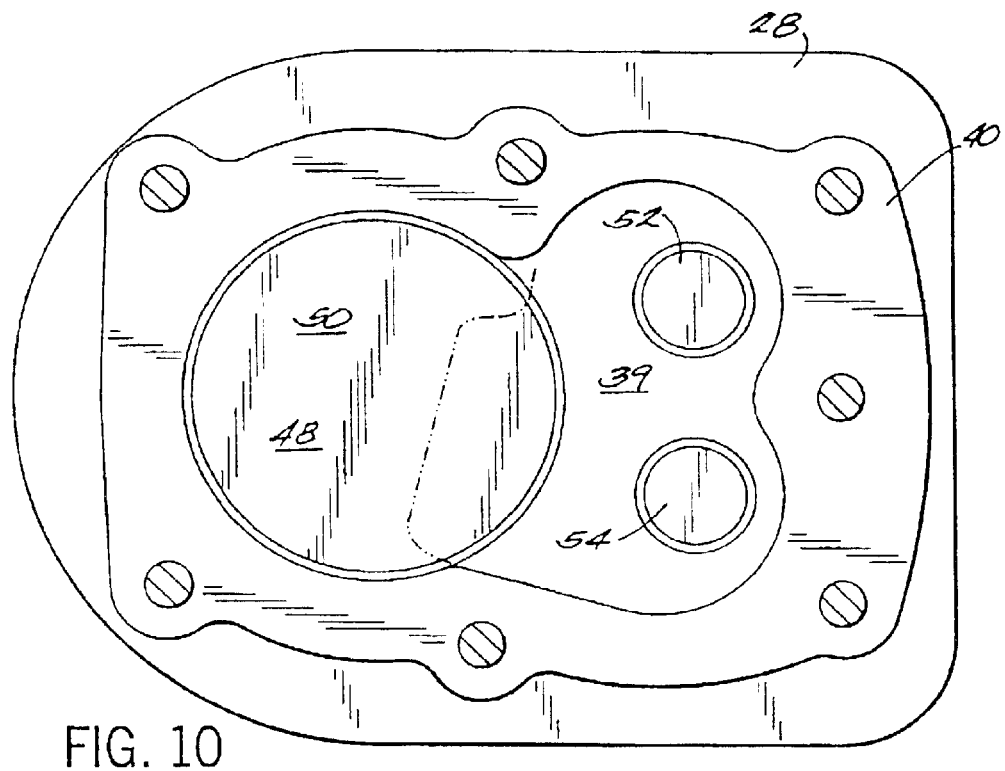
FIG. 10 is a partial schematic view of a top portion of the engine housing taken along line 10—10 of FIG. 3 illustrating the spatial relationship between a combustion chamber, a piston bore, an intake valve and an exhaust valve.
Figure 11:
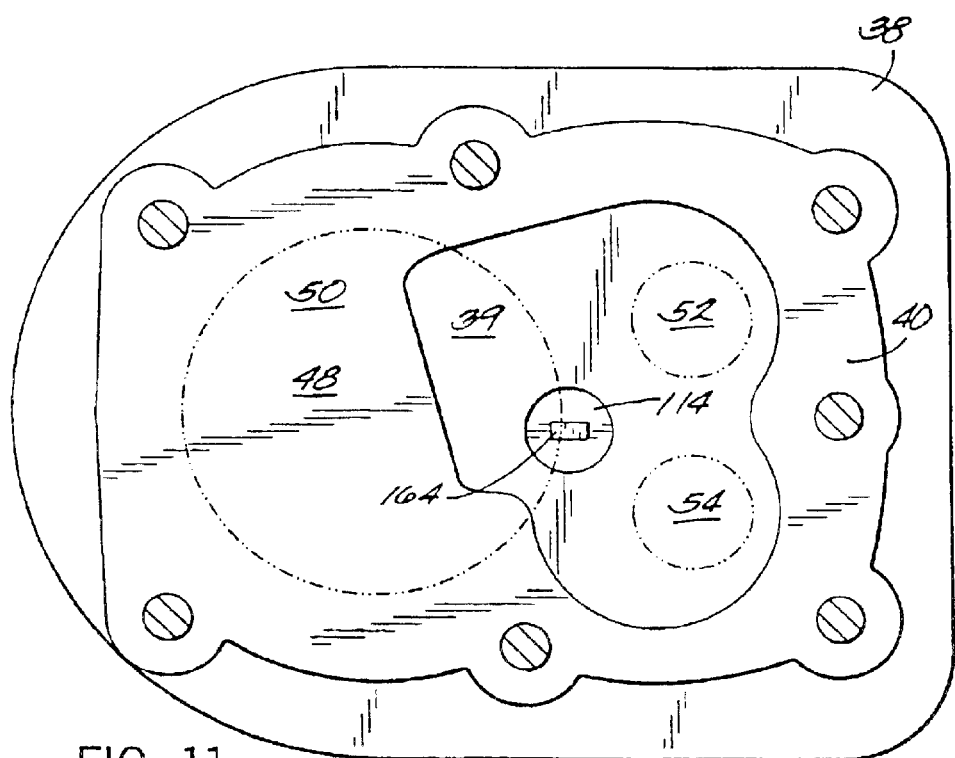
FIG. 11 is a partial schematic view of a cylinder head taken along line 11—11 of FIG. 3 illustrating the spatial relationship between the combustion chamber, the piston bore, the intake valve, the exhaust valve and portions of a spark plug.

FIGS. 10 and 11 schematically show, at least in part, the combustion chamber 39 with respect to the intake valve 52, exhaust valve 54 and piston bore 50. As shown, the combustion chamber 39 only partially extends over the piston bore 50. The orientation of the combustion chamber 39 and shape of the combustion chamber 39 enhances swirl in the mixing chamber 39 so as to provide a better air/fuel mixture to enhance ignition of the mixture. Also, the spark plug 114 is positioned closer to the exhaust valve 54 than it is to the intake valve 52. The electrode 164 is properly oriented to provide a firing spark. Placing the spark plug 114 nearer the exhaust valve 54 allows the hotter air/fuel mixture to be burned sooner by the spark ignited flame front. This will reduce the self-ignition tendency of the hotter air/fuel mixture at the exhaust side of the combustion chamber 39. If the spark plug 114 is positioned closer to the intake valve 52, there is a risk of having two combustions, resulting in a loss of power.

As shown in FIG. 2, the intake port 41 and the exhaust port 45 are located 180 degrees apart from each other. The position of the valves 52 and 54 is a result of the substantially normal arrangement of the cam shaft 98 and crankshaft 80 and allows the ports 41 and 45 to be positioned on opposite sides of the engine housing 28. This provides an additional feature of operator safety. For example, when using a power trimmer, the exhaust port 45 and muffler 44 (FIG. 1) are positioned farther away from the operator during use. Another advantage of placing the ports 41 and 45 as far apart as possible is to reduce heat migration from the exhaust port 45 to the intake port 41 which, if did occur, could result in hot restart vapor lock issues, or difficulty in calibrating the air/fuel ratio.

Figure 12:
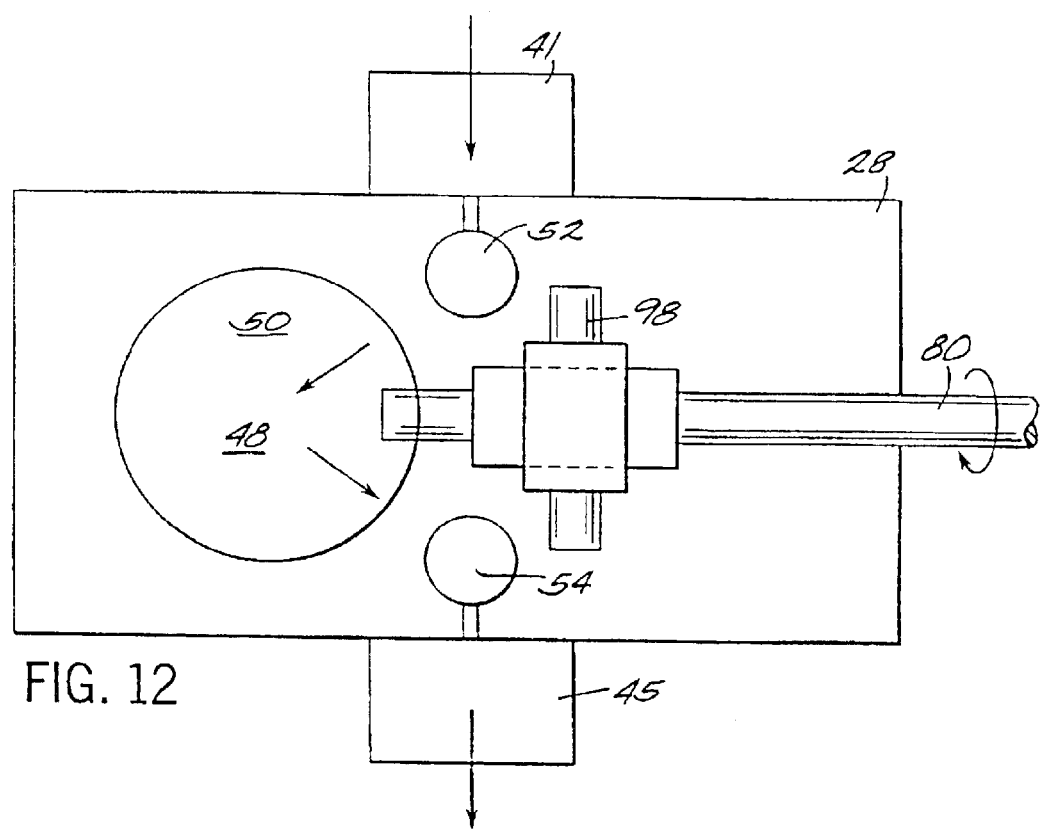
FIG. 12 is a schematic view illustrating the path of an air/fuel mixture through an intake system to the combustion chamber and the path of the exhaust out of the combustion chamber through an exhaust system in an engine according to the present invention.

FIG. 12, with reference to FIGS. 2 and 10 as needed, shows a schematic representation of the path traveled by the air/fuel mixture and exhaust through the engine 20. The air/fuel mixture enters the intake port 41, travels past the intake valve 52, and into the combustion chamber 39. The engine 20 combusts the air/fuel mixture in order to generate power, and the remaining exhaust travels past the exhaust valve 54 and out the exhaust port 45. The arrangement of the cam shaft 98 and the crankshaft 80 is also shown to illustrate how such an arrangement contributes to the overall scheme associated with the air/fuel and exhaust paths through the engine 20.

An important feature of the present invention is that the four-stroke engine according to the present invention is capable of use in substantially any position. A problem with prior conventional four-stroke engines is that if the engine is substantially tilted, the lubricant will run into undesirable locations, such as the carburetor, thereby causing the engine to malfunction or cease working altogether. The four-stroke engine according to the present invention is designed to solve this problem and other problems typically associated with conventional four-stroke engines.

The oil or lubricant reservoir 126, the crank chamber 124, the piston bore 50, and the valve chamber 156 include strategically placed slots, passageways, or apertures so as to enable various working components within the engine to be lubricated at virtually all times during operation. Additionally, in cooperation with the divider 116, the counterweight 76 has been designed such that only a proper amount of lubricant comes into contact with the counterweight 76. The design of the counterweight 76 also allows the counterweight to meter the amount of lubricant that finds its way to the main bearing 70 so as not to flood that part of the crank chamber 124 encapsulating the gears 74 and 104. This also will help prevent too much lubricant from entering the valve chamber 156 through passageway 160 and 162. Moreover, the piston bore 50 and divider 116 have been designed to ensure that the lubricant has a place to go regardless of whether the engine is operating or being stored, so as not to foul the internal components of the engine.

The piston bore 50, connecting rod 84, the crankshaft assembly 82, the cam shaft assembly 106, and the valve chamber 156 and the components therein all require some lubrication. It is a feature of the present invention to use a minimal amount of lubricant or oil to lubricate the engine. This is accomplished in a number of ways. First, the highest part that needs lubrication, considering when the engine is in an upright (spark plug up) condition, is the valve chamber 156. Second, the roller bearings 86 and 88 for the connecting rod 84 require less lubrication versus a solid shaft with aluminum bushings. Third, since the lubricant will follow the path of least resistance, the divider 116, the counterweight 76 and the various slots, apertures and passageways previously mentioned help direct the lubricant to particular areas of the engine depending on the attitude of the engine.

In an upright non-operating position, lubricant or oil is stored within the oil or lubricant reservoir 126. In this position and in this state, the level of the lubricant is preferably below the bottom slot 118 in the divider 116. During operation, the reciprocating movement of the piston 48 creates pressure pulses within the internal cavity of the engine 20. The lubricant moves in response to the movement of the piston 48. The counterweight 76 agitates the lubricant or oil and blow-by gas within the inside cavity of the engine 20. As the piston 48 travels in its downward direction during the intake and power strokes, the lubricant is forced through the main bearing 70 to lubricate the bearings 70 and 68, the worm-helical or spiral gears 74 and 104, the crankshaft 80, the cam shaft 98 and the bushings 94 and 96 due to increased pressure in the engine cavity. The action of the cam gear 104 will cause some lubricant to enter aperture 160 and migrate to the valve chamber 156. Moreover, any oil found in piston bore 50 could be pushed into aperture 162 to also lubricate the valve chamber 156. On the upward strokes, i.e., the compression and exhaust strokes, the lubricant will be drawn back over the just mentioned areas to further lubricate the components due to a partial vacuum in the engine cavity. The reciprocating movement of the piston 48 moves the lubricant back and forth within the internal cavity of the engine 20. The invention does not require a control valve to control movement of the lubricant.

There are at least a couple of aspects to consider when discussing lubricating the engine 20. First, there is resistance or energy lost as the counterweight 76 agitates the lubricant and blow-by gas. Second, it is undesirable to supply too much lubricant to the piston bore 50 and the valve chamber 156 which, if did occur, could result in damage to the engine 20.

As noted, since the static oil level is preferably below the bottom slot 118 in an upright condition, the counterweight 76 preferably does not dip directly into the lubricant, although direct dipping could be used. The more direct contact made with the lubrication, the more energy that is lost from the engine 20. The least amount of lubricant resistance is desired. As mentioned, the counterweight 76 is designed to throw the lubricant away from the main bearing 70 and towards the sump cover 32. The design of the counterweight 76 also limits the amount of lubricant slung into the piston bore 50. In this way, only a limited amount of oil will find its way to the valve chamber 156. The counterweight 76 is designed to reduce the amount of drag that the counterweight 76 has when it is rotating through and churning up the lubricant. In addition, the counterweight 76 design reduces windage which creates a more efficient engine. It should be noted that although the counterweight 76 is shown and described as the device which agitates the lubricant and blow-by gas within the internal cavity, a separate agitator may be provided to accomplish the same results. Such an agitator may be a splasher or mixer attached to the rotating crankshaft or connecting rod, or caused to rotate in any number of other ways.

Figure 13:
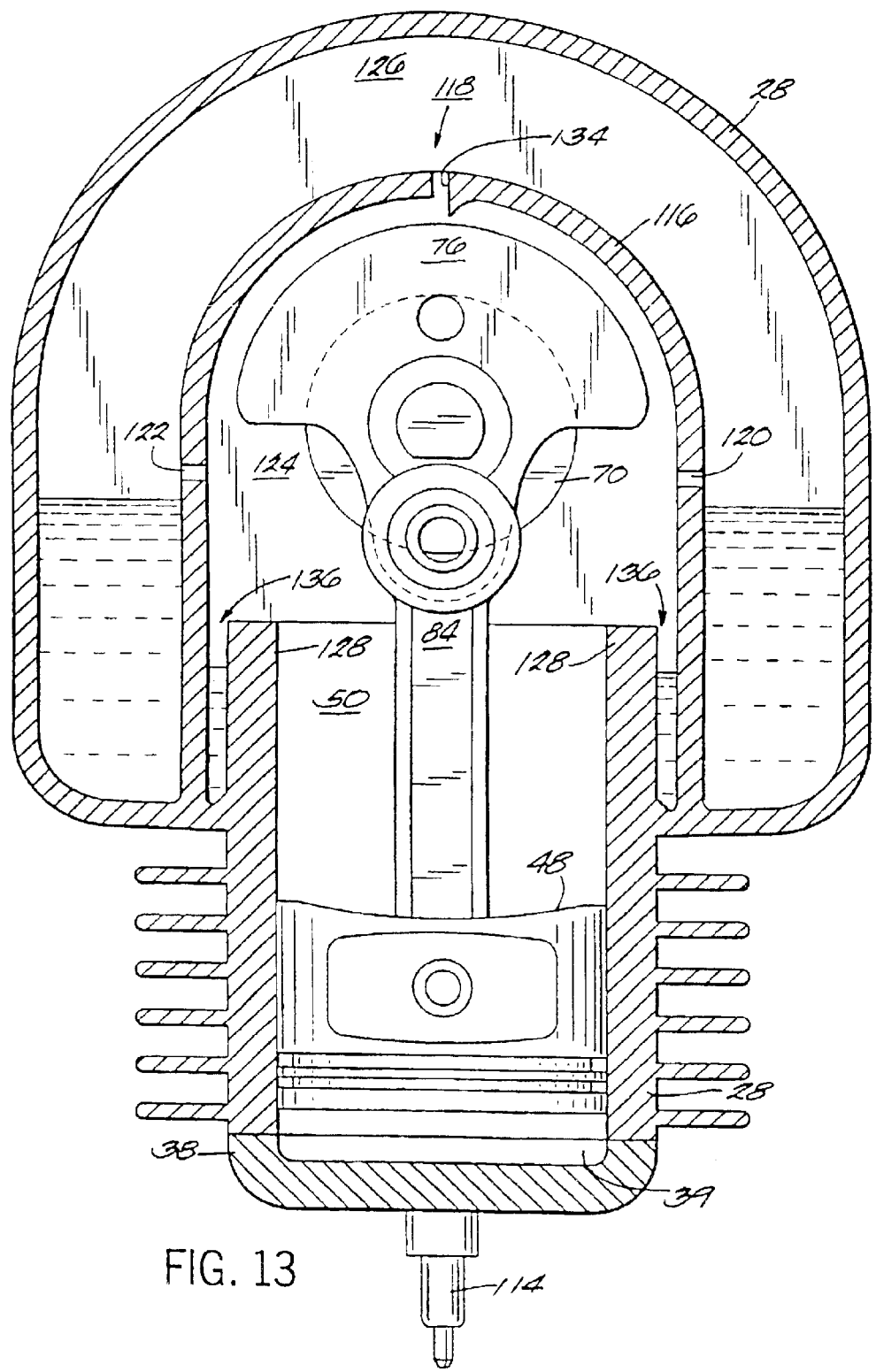
FIG. 13 is a cross-sectional partial schematic view of an engine according to the present invention showing the state of the lubricant in the crank chamber and an oil reservoir when the engine is in an upside down state.

In an upside down (spark plug down) position such as that shown in FIG. 13, the extended piston bore 50, the divider 116, the slots 118, 120 and 122, and the passageways 160 and 162 (FIGS. 2 and 3) ensure that the engine will continue to function properly, for at least a limited amount of time, or be capable of storage in this position without fouling the engine. During operation, the changing pressure pulses, the blow-by gas and the agitator 76 will cause the lubricant to be mixed and moved inside the cavity of the engine 20. Although some oil will be flung into the piston bore 50, not a significant amount will go there. Also, it should be noted that the access passageway 162 is located such that the oil ring 166 in the piston 48 does not travel over or past the passageway 162 as the piston 48 reciprocates within the piston bore 50 (FIG. 5). Otherwise, it would be possible for lubricant found within the valve chamber 156 to find its way into the combustion chamber 39, thereby burning off the lubricant and creating excess emissions.

The crank chamber 124 includes the area or space 136 between the extended piston bore 50 and divider 116 for receiving oil or lubricant when the engine is tilted or inverted as representatively shown in FIG. 13. During storage, the slots 118, 120 and 122 will allow most of the oil to remain in the oil reservoir 126, and the area 136 between the divider 116 and the piston bore 50 will hold most of the remaining lubricant. Any oil left in the valve spring chamber 156 during use is thought to be negligible and will not significantly affect the operation of the motor. Importantly, because of the positioning of the slots 120 and 122 above the oil in the inverted position, the valve chamber 156 will not be able to receive any significant amount of oil.

To further explain certain features of the present invention, the oil reservoir 126 should be in communication with the crank chamber 124 so as to allow for proper lubrication of the engine 20 in substantially any operational position. The various described slots, passageways, holes and apertures perform at least two functions. First, if the engine 20 is operating in a sideways condition, the slot 120 or 122 in the divider wall 116 facing down towards the ground allows oil to travel into the crank chamber 124 with the pressure pulsations in a manner similar to when the engine is in an upright state during which lubricant moves through the bottom slot 1118. Second, if for whatever reason, a significant amount of lubricant finds its way to the crank chamber 124 during operation and the engine 20 is turned off and turned upside down or sideways for storage, the side slots 120 and 122 allow oil to migrate from the crank chamber 124 to the oil reservoir 126 so as to prevent the piston bore 50 and valve chamber 126 from undesirably receiving a significant amount of lubricant.

Another important feature of the present invention is to be able to vent blow-by gas from the crank chamber 124 by separating the blow-by gas from the lubricant/blow-by gas mixture. As described, the cam shaft 98 is provided with a hollow passageway 152 and properly positioned radial passages 154. With reference to FIG. 2, one end of the cam shaft cover 108 includes a nipple 168 which is attached to a flexible hose 170 (schematically shown). Although not shown, there may be an oil seal placed between the cam cover 108 and engine housing 28. As the pressure pulse forces the lubricant/blow-by gas mixture through the main bearing 70, the blow-by gas is driven into the radial holes 154 and passageway 152 while the oil is prevented from passing through the holes 154 as a result of the centrifugal action of the operating cam shaft 98. The blow-by gas travels through the cam cover 108 and nipple 168 affixed to cam cover 108, through the flexible hose 170 and back into the intake of the carburetor 42. A check valve may be positioned between the end of the cam shaft 98 and the air intake system to maintain the negative pressure created within the engine.

Figure 14:
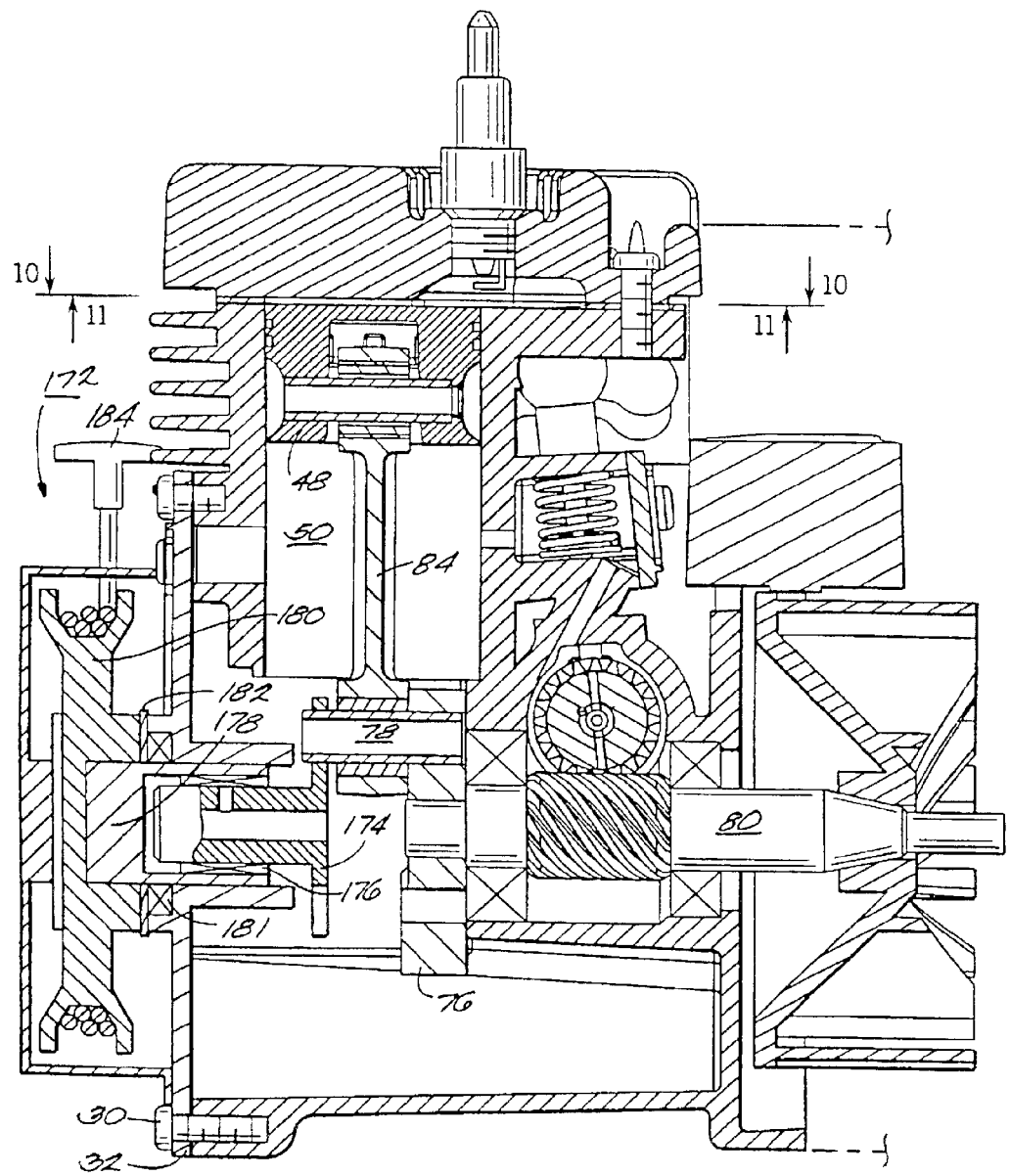
FIG. 14 is a cross-sectional view of another embodiment of the present invention showing a starter assembly attached to the rear of a four-stroke internal combustion engine.

FIG. 14 shows a cross-sectional view of the four-stroke engine according to the present invention with a starter mechanism 172 attached to the sump cover plate 32 with screws 30. A crankshaft adapter 174 is connected to crank pin 78. A clutch bearing 176 is press fitted around the crankshaft adapter 174. A starter shaft 178 is positioned around the clutch bearing 176 and is keyed or molded to the starter 180. An oil seal or O-ring 181 is placed around the starter shaft 178 to provide a seal between the starter mechanism 172 and the sump cover 32. A thrust washer or bearing 182 is placed on each side of the starter 180. Starter 180 is preferably a rewind starter having a pull cord 184. Locating the starter mechanism 172 or the sump cover 32 on the back of the engine 20 enables the operator to have easy access to the pull cord. Further, integrally connecting the starter to the piston 48 through connecting rod 84 and the crankshaft 80 through the crank pin 78 reduces the rope pull force needed to start the engine 20. Alternatively, other starter assemblies may be utilized.

FIGS. 15–18 depict a layout for the dies used to manufacture an engine housing according to the present invention. The engine housing is designed to permit two engine housings to be produced using one die tool and one die casting machine. The engine housing is designed to include walls which allow for the needed draft angles given different orientations for each engine housing within the die tool. The draft angles enable the engine housing to readily separate from the die. The engine housing is designed to permit slide tooling access (i.e., the piston and cam shaft bores) when two engine housings are fabricated from one tool. In FIGS. 15–18, the dies 188 and 190 are formed so that the centerlines of the engine cylinder bores (which are parallel to direction C) are parallel to each other. Boxes 194 and 196 represent the edges of the tool. By positioning the dies in this manner, the inserts used to form the dies are inserted only along a few directions, i.e., in directions A, B and C. This die configuration reduces the overall space required to make the engine housings, while still enabling two engine housings to be made at the same time. The two die halves 188 and 190 are parted along parting line 192. It should be noted that the back wall of the engine housing is not shown and is separately formed and then fastened to the engine housing with bolts or other suitable fasteners. It is, however, possible that the back wall could be formed integral with the engine housing according to the principles set forth above. It should also be noted that the parting line 192 could be moved to another location. The draft angles of the engine housing outer walls would change accordingly so as to accommodate the new location of the parting line.

Figure 39:
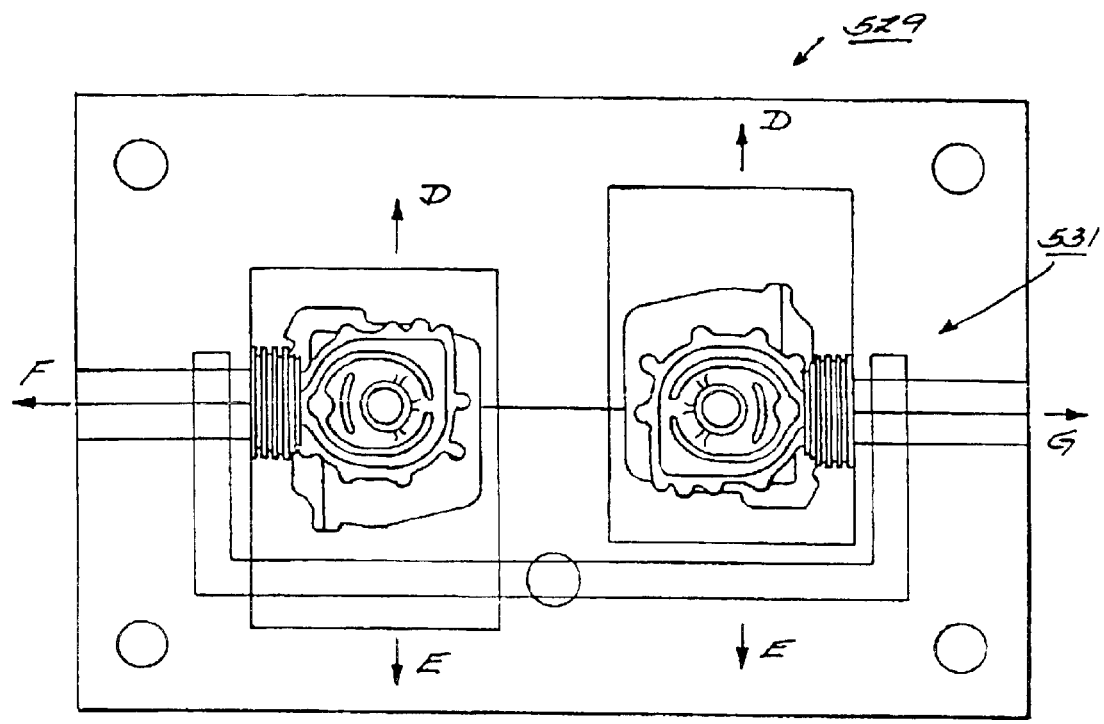
FIGS. 39–40 are schematic representations of two engine housings which are capable of being produced using one die tool and one die casting machine.
Figure 40:
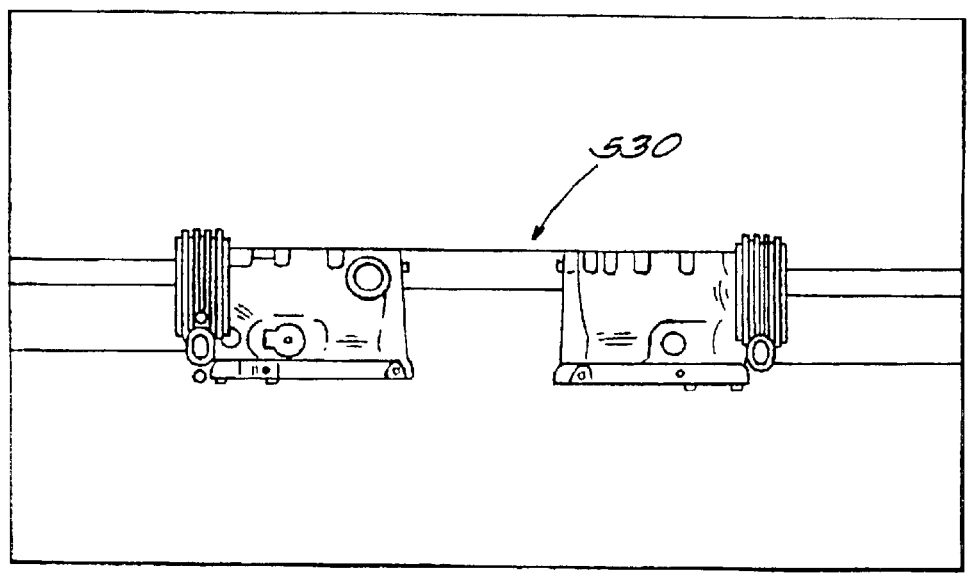

FIGS. 39–40 depict another embodiment of a layout for the die 529 used to manufacture an engine housing according to the present invention. In this embodiment, it is still possible to permit two engine housings to be produced using one die tool and one die casting machine. The die 529 is laid out in such a manner that the centerlines of the piston bores are parallel but in opposite directions. Further, both cavities are oriented such that the stationary bodies of material compose the internal features of the oil reservoir, the barrier wall and the inner crank chamber. The engine housing is designed to include walls of which are needed for draft angles parting line jumps, and slide shut-offs for the given orientation within the die layout. By orienting the die in such a prescribed manner, the inserts for the die pieces are inserted only along a few directions, i.e., in directions D, E, F and G. This embodiment of the die layout also serves to minimize the overall space necessary to manufacture the two-engine housings out of a single die.

With such a die layout, the datum targets or reference features for both cavities are created by the same piece of stationary material. By having these references on the same piece of stationary material, there is less variance to accommodate between the casting in the machining of the finished engine housing. This further translates into less variance in the finished-machined engine housing even though the casting is being derived from two separate cavities.

As shown, this embodiment also integrally creates the flywheel back-plate into the engine housing casting. It is further desirable to gate 531 the casting into the deck of the cylinder and route the gates parallel to directions F and G into the cavities.

The engine 20 shown in FIG. 1 has been described in such a manner to identify the various aspects of the present invention. However, the features of the present invention described above may be incorporated into other four-stroke internal combustion engine configurations. Moreover, the features identified above may be slightly modified to accommodate different engine designs. As such, FIGS. 19–40 illustrate another four-stroke internal combustion engine in which the features previously described may be employed and which incorporates additional inventive features not yet previously described. It should be noted that the features specifically described in relation to FIGS. 19–40 may be incorporated into the engine described in FIGS. 1–18, or other engines.

Figure 19:
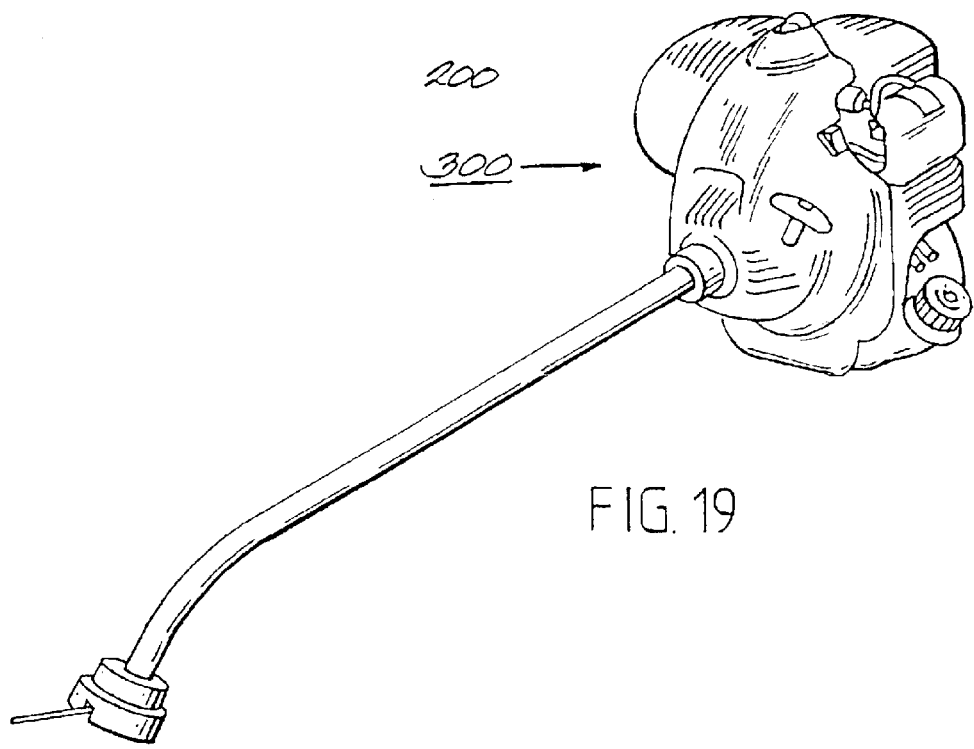
FIG. 19 is a schematic view of a power trimmer in which another four-stroke internal combustion engine according to the present invention is employed.

FIG. 19 illustrates a four-stroke internal combustion engine 300 according to the present invention. The engine 300 is shown as used in a power trimmer but may be used in other devices as described for the engine of FIG. 1.

Figure 21:
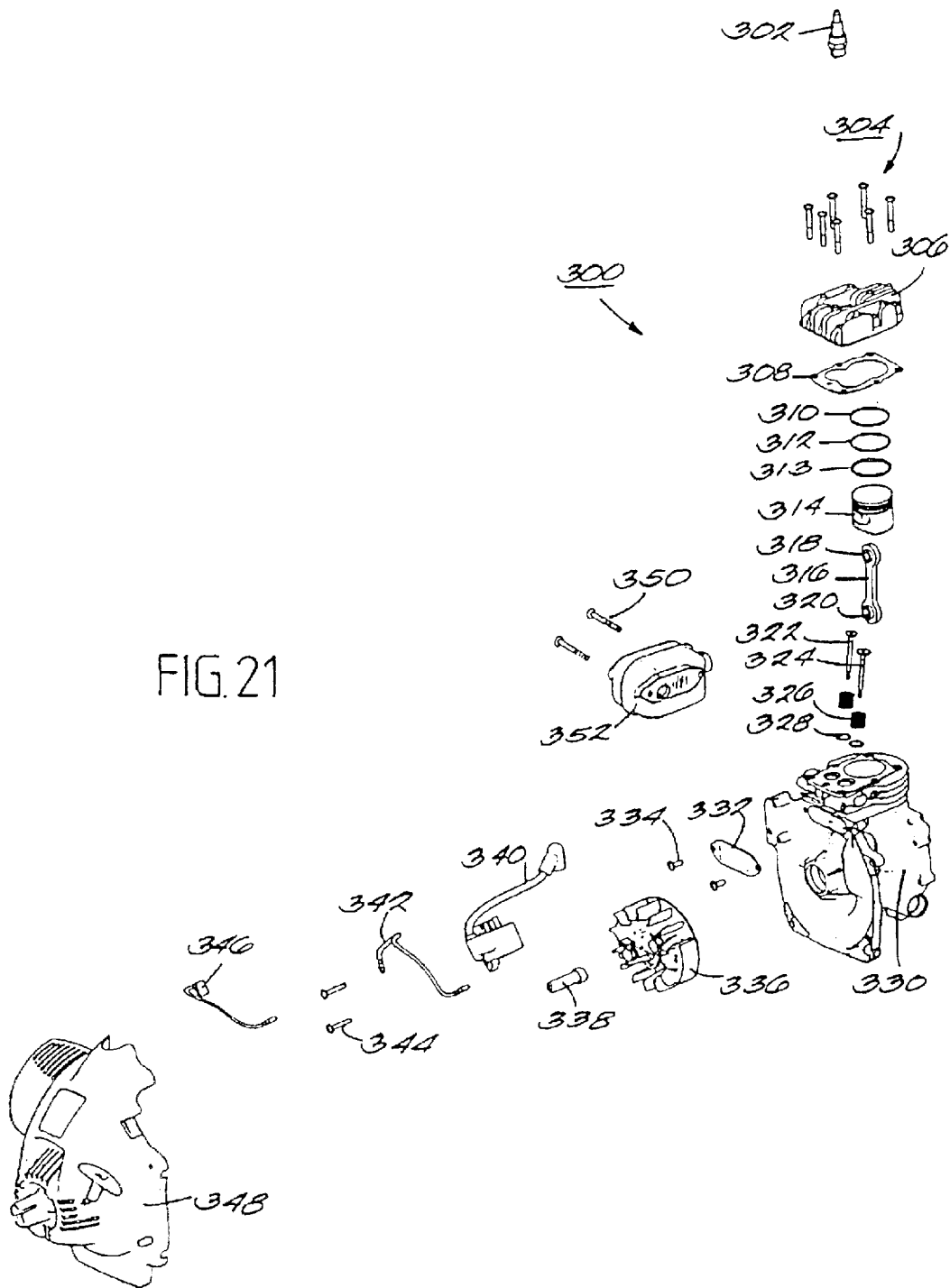
FIG. 21 is an exploded partial perspective view of the four-stroke engine of FIG. 19.
Figure 22:
FIG. 22 is another exploded partial perspective view of the four-stroke engine of FIG. 19.

Again, before describing in detail the various features of the present invention, the components shown in FIGS. 21 and 22 are identified for the sake of clarity. Many of the components are assembled in the same or similar manner as described in reference to FIG. 1 or as generally understood by those skilled in the art. Accordingly, the manner of assembly is not described in great detail below except if the manner of assembly pertains to specific features of the present invention. Greater detail of such features will be provided in reference to the drawings to follow when needed. Shown in FIG. 21 are spark plug 302; cylinder head screws 304; cylinder 306; cylinder head gasket 308; compression rings 310 and 312 and oil ring 313 which are appropriately positioned in annular slots located in piston 314; connecting rod 316 and connecting rod bearings, preferably needle roller bearings, 318 and 320; exhaust valve 322, intake valve 324, valve springs 326 and valve spring keepers 328; engine housing 330; valve cover 332 and associated screws 334; flywheel 336, crankshaft adapter 338, ignition coil 340, wiring assemblies 342 and 346, and screws 344 all of which are part of a starter assembly; muffler mounting bolts 350; muffler 352; and blower housing 348 which is part of an overall shroud further described below.

Shown in FIG. 22 are sealing O-ring 366 and oil gauge 367; intake gasket 368, intake isolator 369 and screws 370; carburetor gasket 372, carburetor 374 and O-ring 376; air filter assembly 378, screws 380 and air filter cover 382; wrist pin 384 and star washer wrist pin retainer 386; oil sealing ring 388, roller bearing 390, crankshaft 392 and counterweight 393; sump cover 394 and screws 396; muffler housing 398 which is part of an overall shroud further described below and mounting screws 400; tappets 402, cam shaft 404, cam shaft cover 406; screws 408 and breather tube 410; check valve 411; fuel tank 412 having fuel line 414, opposing shoulders 416; and filter material 418 which is placed around shoulders 416 as further described below.

Other components and features not clearly shown in FIGS. 21 and 22 will be described below. Moreover, the significance of any of the components shown in FIGS. 21 and 22 or their interaction, will be described below in conjunction with the principles of the present invention.

Figure 23:
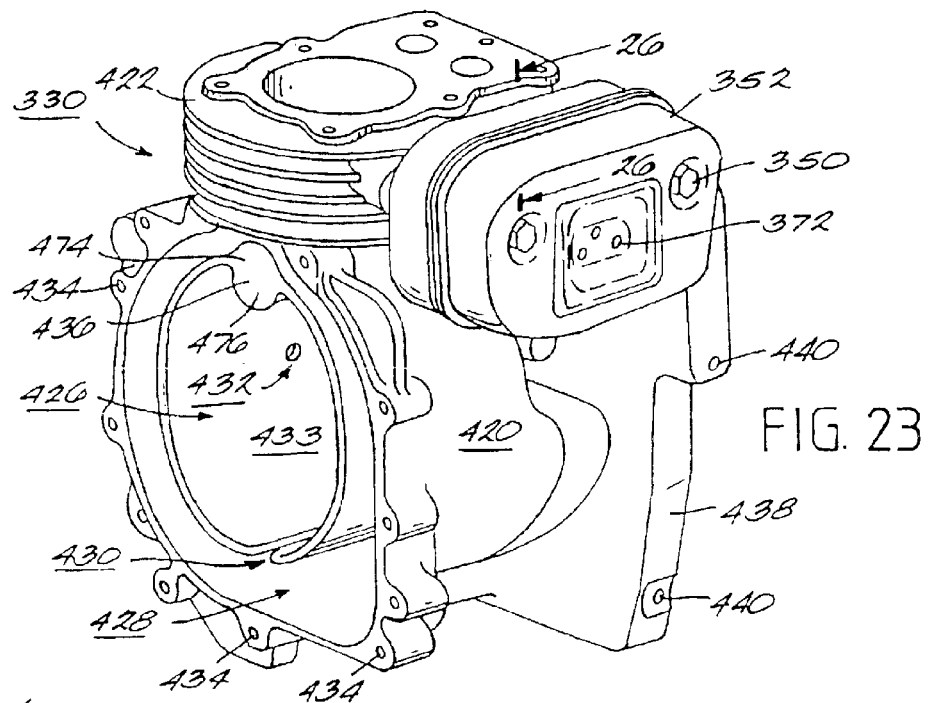
FIG. 23 is a perspective view of an engine housing with a muffler attached thereto.

FIG. 23 more clearly shows the engine housing 330 with the muffler 352 attached thereto by mounting bolts 350. The engine housing 330 includes a crankcase 420 and a cylinder 422. The cylinder head 306 (FIG. 21), which at least partially defines a combustion chamber, is disposed adjacent to the cylinder 422. A crank chamber 426 is disposed within the crankcase 420. An oil reservoir 428 is also disposed within the crankcase 420 and is in fluid flow communication with the crank chamber 426, preferably, through slot 430 and opposing holes 432 (only one being shown) disposed in a divider 433. The divider 433 is disposed within the crankcase 420 and at least partially divides the crank chamber 426 and the oil reservoir 428. A plurality of holes 434 are provided in the engine housing 330 so that the sump cover 394 and sump cover gasket can be attached thereto. The engine housing 330 also includes an oversized wrist pin boss 436. The wrist pin boss 436 may be integrally formed with the divider 433. The function of the wrist pin boss 436 will be further described below. The engine housing 330 also includes a flywheel back plate 438 with at least one mounting boss 440, the function of which will be described below.

Figure 24:
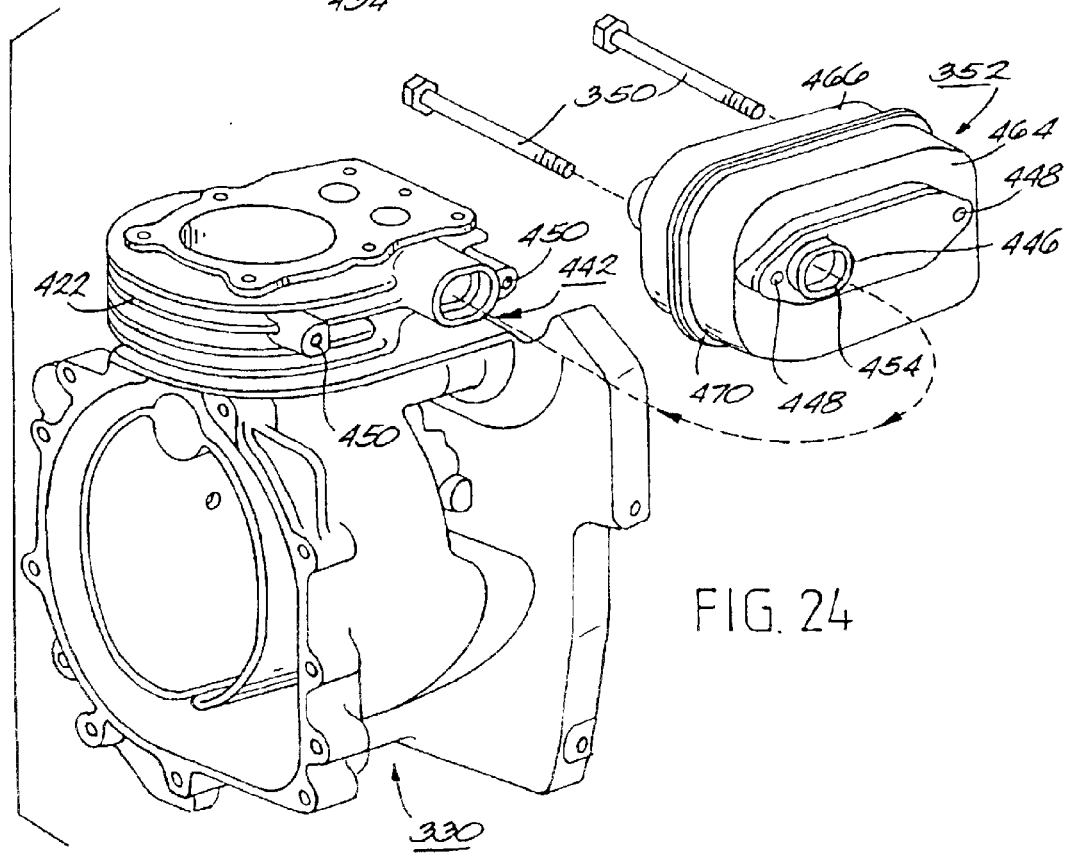
FIG. 24 is an exploded perspective view of FIG. 23.
Figure 25:
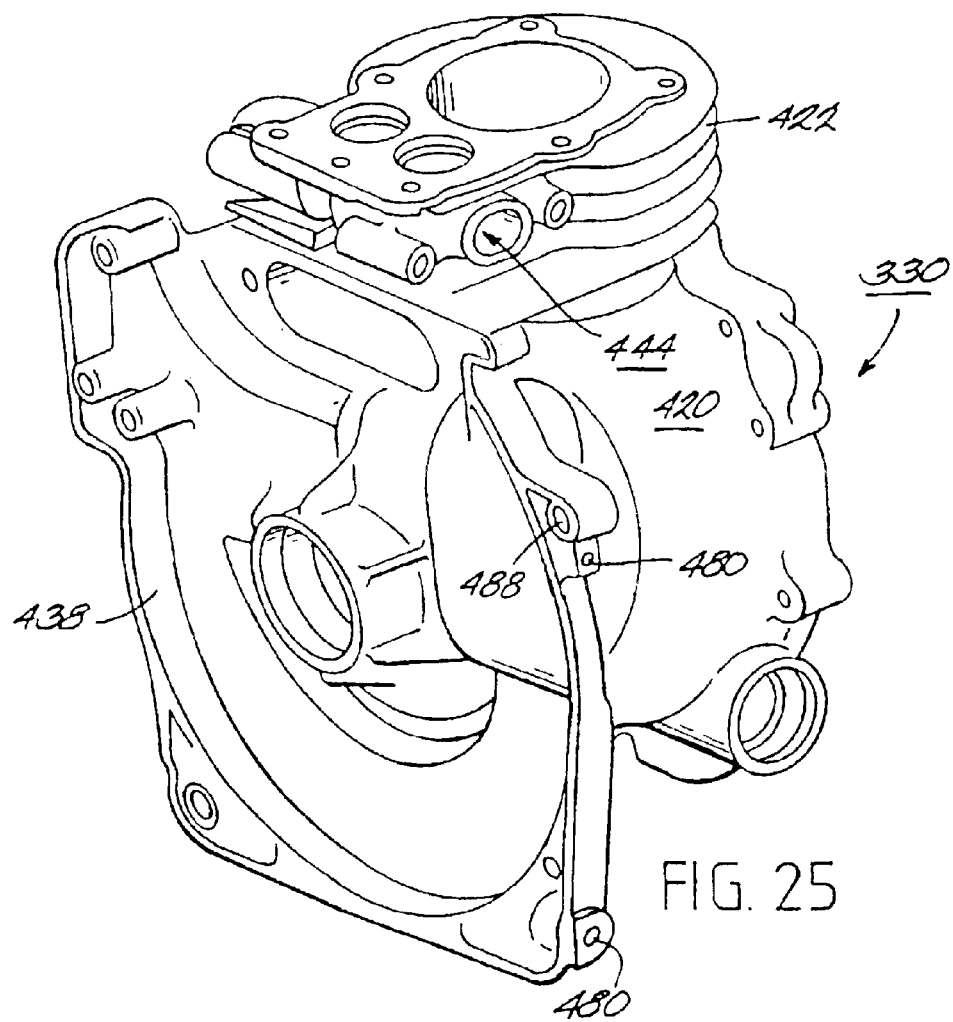
FIG. 25 is a perspective view illustrating the flywheel end of the engine housing of FIG. 23.

FIG. 24 is an exploded perspective view of FIG. 23 showing how the muffler 352 is connected to the engine housing 330. The cylinder 422 includes an exhaust port 442 and an intake port 444 (FIG. 25). Preferably, the intake port 444 and exhaust port 442 are elliptical in shape thereby enabling the overall height of the engine housing 330 to be reduced. This will naturally reduce the overall weight of the engine housing, which is an especially important factor for hand-held power tools. The walls of the ports 442 and 444 are provided with sufficient material so as to be able to support the weight of the engine housing 330 and cylinder head 306 disposed thereabove.

The muffler 352 includes a boss 446 which is preferably elliptical. The boss 446 extends into the exhaust port 442. Mounting bolts 350 extend through holes 448 in the muffler 352 and into holes 450 formed in the cylinder 422. Preferably, the holes 448 are spaced apart and positioned on opposite sides of the exhaust port 442 to maximize the stability of the muffler 352 with respect to its connection to the cylinder 422.

Figure 27:
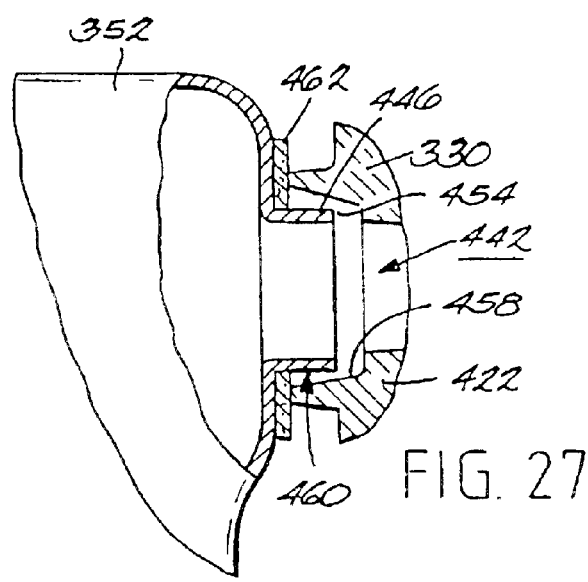
FIG. 27 is an alternative connection between the engine housing and muffler of FIG. 26.

FIGS. 26 and 27 are enlarged partial cross-sectional views taken along line 26—26 of FIG. 23 showing preferred alternative mounting connections between the muffler 352 and cylinder 422. FIG. 26 shows the engine housing 330 having an angled, step sealing surface 452 located in the exhaust port 442 of cylinder 422. The end 454 of boss 446 can mate against the exhaust port sealing surface 452 to substantially prevent exhaust from undesirably escaping into the environment. Preferably, a sealing gasket 456 is positioned between the end 454 of the boss 446 and the sealing surface 452 to even better prevent the exhaust from escaping.

FIG. 27 shows the outside liner of the boss 446 of the muffler 352 surrounded by the surface 458 of the exhaust port 442, thereby defining a clearance space 460 therebetween. Although surface 458 is shown as an angled surface, it may take on other configurations so long as clearance space is provided between the muffler 352 and the exhaust port 442. A gasket 462 is positioned between the muffler 352 and cylinder 422 or engine housing 330 to seal the clearance space 460, thereby preventing exhaust from escaping into the atmosphere. Preferably, the gasket 462 is an enlarged gasket which also serves as a heat shield between the engine housing 330 and the muffler 352.

The muffler 352 (FIG. 24) preferably includes a pair of outer shells 464 and 466 having respective mounting bolt holes 448 for the mounting bolts 350. An inner shell or baffle plate (not shown) is preferably located between the outer shells 464 and 466. The inner shell also is adapted to allow the mounting bolts 350 to pass therethrough. The baffle plate is designed to reduce noise. Outer shell 464 includes a shoulder 470 which extends around an edge of the outer shell 464. Outer shell 466 includes a flange (not shown)

which extends around an edge of the outer shell 466. Upon assembly, the shoulder 470 receives the flange such that if exhaust does leak out of muffler 352, the exhaust will leak away from the engine. Although not shown, a deflector may be placed over the exhaust holes 372 (FIG. 23) of the muffler 352 to protect the operator from receiving a direct blast of exhaust.

Figure 31:
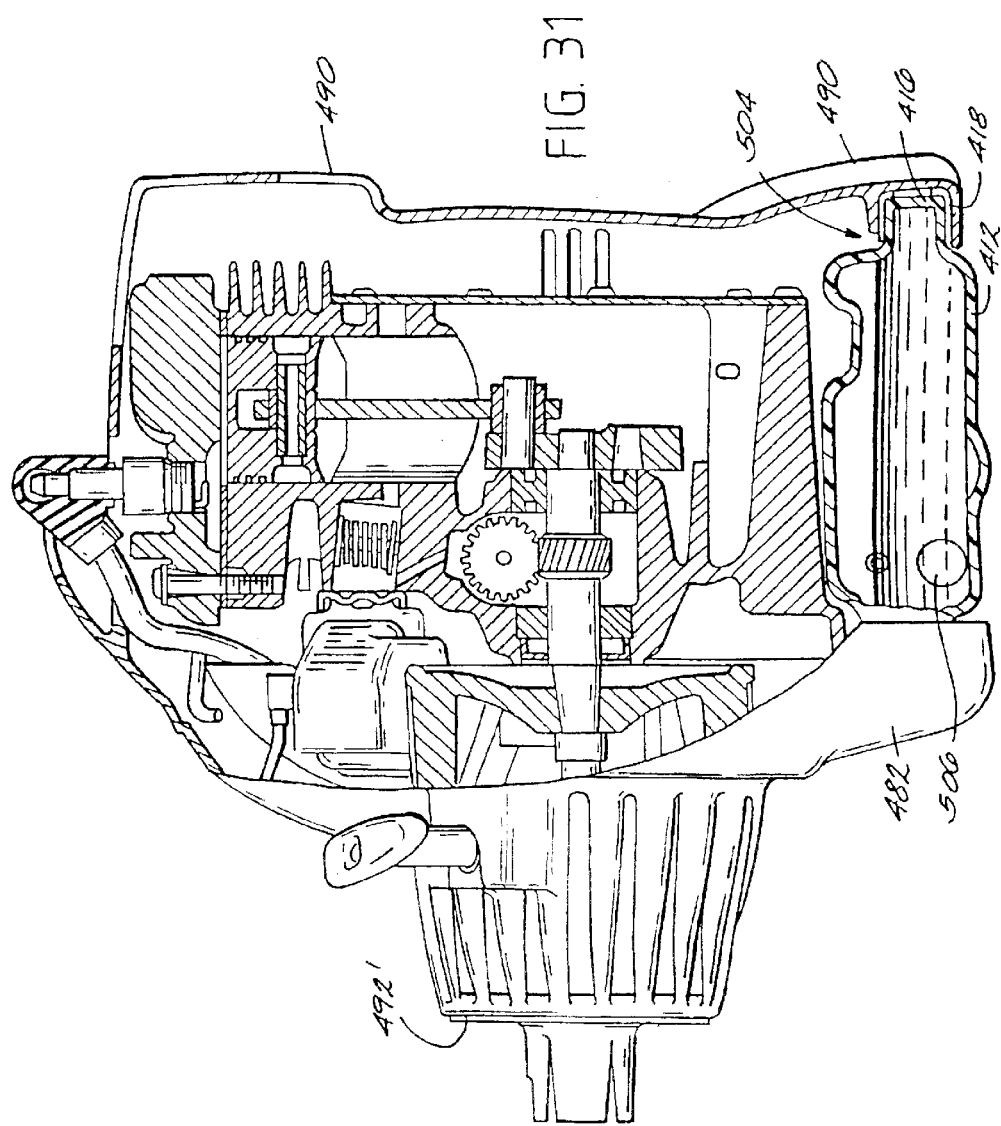
FIG. 31 is a partial cross-sectional side view of the assembled engine of FIGS. 21 and 22.
Figure 32:
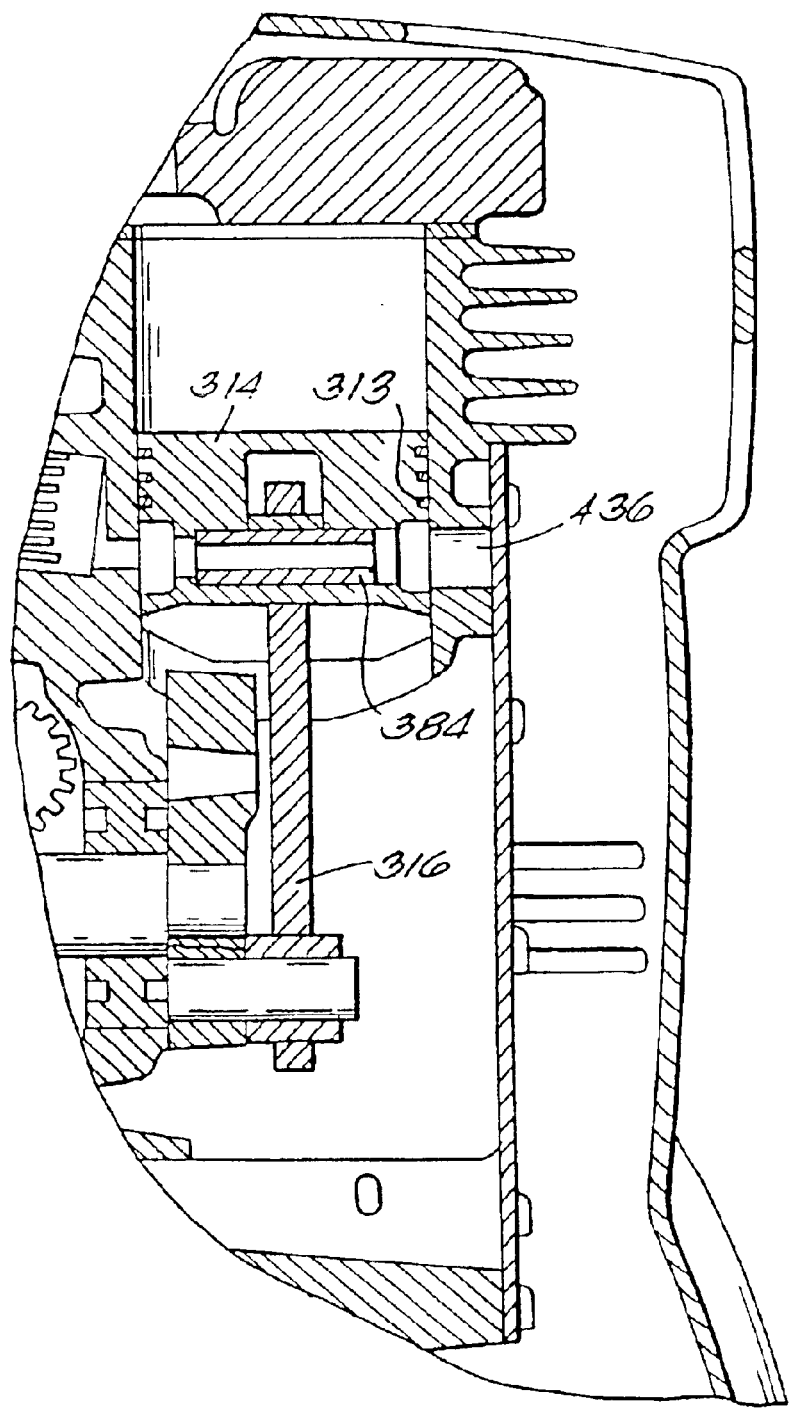
FIG. 32 is an enlarged view of a portion of the engine shown in FIG. 31 illustrating a piston in its bottom dead center position.
Figure 34:
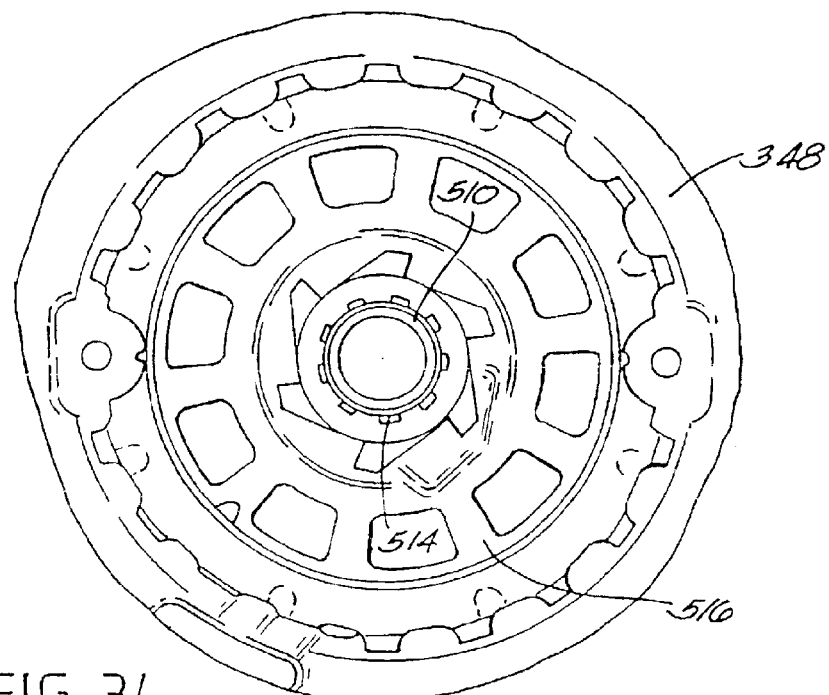

Given the nature of the four-stroke engine according to the principles of the present invention, it is desirable to provide an economical engine with features which allow the engine to be easily assembled. One feature is to use the same engine housing 330 for engines having different horsepower ratings, simply by changing the connecting rod 316 (FIG. 21) and thus, the length of the piston throw. To accomplish this feature, the oversized wrist pin boss 436 (FIG. 23) is provided. The wrist pin boss 436 can be machined at its upper end 474 to provide an access hole (not shown) in the crankcase 420 for a first piston throw, and the wrist pin boss 436 can be machined at its lower end 476 to provide an access hole (not shown) in the crankcase 420 for a second piston throw. After the wrist pin boss 436 is properly machined, the wrist pin 384 (FIG. 22) is inserted through the crankcase access hole and into the piston access hole to connect the piston 314 (FIG. 21) to the connecting rod 316 (FIG. 21). Accordingly, the same engine housing 330 can be used for different sized engines. FIG. 31 shows a completed assembly on such engine. FIG. 32 shows the piston 314 in its bottom most dead center position so that the wrist pin 384 can be appropriately positioned within the engine.

FIG. 28 is an enlarged view of the engine housing 330 of FIG. 24 without the muffler 352. As shown, the divider 433 defines a path 478 which extends substantially about the divider 433 and over the wrist pin boss 436. The path 478 allows lubricant found in the oil reservoir 428 to flow around a substantial portion of the divider 433 to further enhance the lubricating and storage features according to the principles of the present invention. The path 478 allows the amount of lubricant found on both sides of the divider 433 to equalize when the engine 300 is turned upside down. This further inhibits a substantial amount of the lubricant from migrating into the crank chamber 426.

Another feature which reduces assembly costs of the engine thereby reducing the overall cost of the engine relates to the manner of assembling a shroud to the engine housing. As noted with reference to FIG. 23, the flywheel back plate 438 is provided with at least one mounting boss 440. FIG. 25 is a perspective view of the engine housing 330 of FIG. 23 only from a different perspective. As shown, the opposite side of the flywheel back plate 438 also includes at least one mounting boss 480. Upon assembling the engine 300, an assembly fixture (not shown) is adapted to hold the engine 300. Each mounting boss 440 and 480 receives a separate pin (not shown) of the assembly fixture to secure the engine housing 330 to the assembly fixture. A shroud 482 (FIG. 20) is provided to at least partially surround the engine housing 330. Preferably, the shroud comprises the blower housing 348 (see also FIG. 21) and muffler housing 398 (see also FIG. 22). Shroud 482 includes at least one slot 484. Each slot 484 is designed to surround a respective pin of the assembly fixture extending out of the mounting bosses 440 and 480 when the shroud 482 is positioned around the engine housing 330. The shroud 482 can be attached to the engine housing 330 by threading screws 486 (FIG. 20) into respective holes such as hole 488 (FIG. 25) of the engine housing 330. Thus, the entire engine 300 can be substantially assembled while remaining attached to a single assembly fixture.

Another feature of the shroud 482 is that the muffler housing 398 preferably includes a plurality of raised portions 490 (FIG. 31). Thus, if desired, the engine 300 may be placed on the ground to rest on the raised portions 490. It should be noted that the blower housing 492' of FIG. 31 is slightly different from the blower housing shown in FIG. 20. The purpose of this is to show that various suitable configurations of the shroud 482 are possible without affecting the scope of the present invention.

Figure 20:
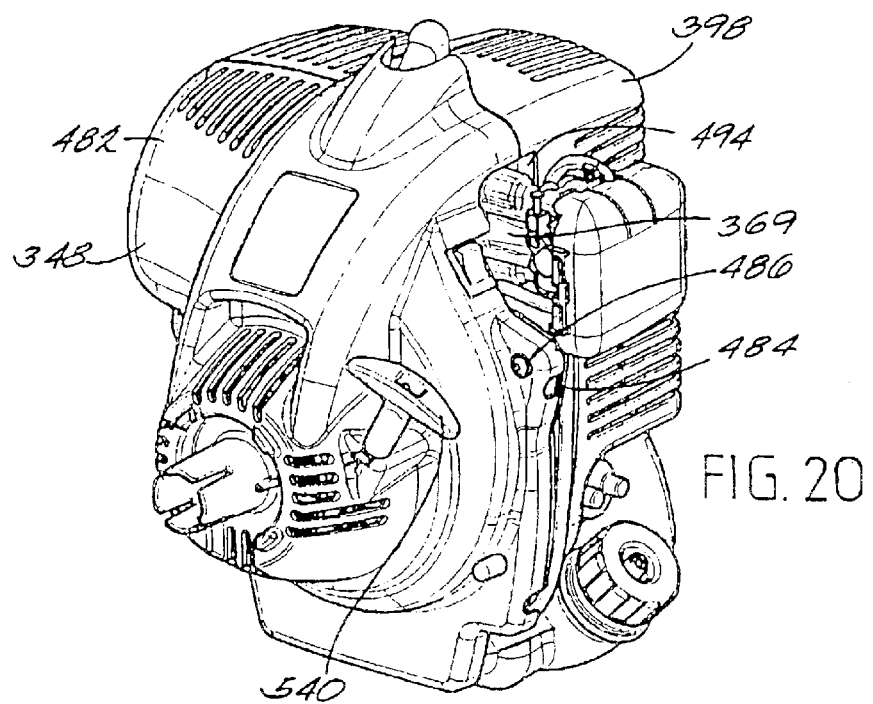
FIG. 20 is a perspective view of a shroud which at least partially surrounds an engine, wherein the shroud is adapted to enhance overall assembly operations of the engine.

As shown in FIG. 20, the shroud 482 is provided with an opening 494 which surrounds the intake port 444 (FIG. 25). An intake isolator 369 (FIG. 22) having an air/fuel passageway 496 (FIGS. 29 and 30) extending therethrough is provided. The intake isolator 369 is mounted to the engine housing 330 so that the air/fuel passageway 496 is aligned with the intake port 444. The intake isolator 496 is positioned within the opening 494 of the shroud 482 to substantially ensure that cooling air passing between the engine housing 330 and the shroud 482 cannot escape through the opening 494 in the shroud 482. Preferably, the intake isolator 369 includes an integrally formed back wall 498 and a side wall 500 (FIG. 22) to accomplish this feature.

To further reduce manufacturing costs, the crankcase 420, the cylinder 422 and the back plate 438 are cast as a single component. In a preferred embodiment, the engine housing 330 further includes at least one fin 502 integrally formed thereto (FIG. 28). The fin 502 extends from the back plate 438 and beneath the crankcase 420 for stability and cooling purposes.

Although the shroud 482 may be of many different designs consistent with the principles of the present invention, the shroud 482 is designed to hold the fuel tank 412. As best shown in FIG. 31, the shroud 482 is provided with a pair of opposed channels 504 (only one is shown). The outwardly extending shoulders 416 (see also FIG. 22) are received by the respective channels 504 so that the fuel tank 412 is held by the shroud 482. The filler material 418 (see also FIG. 22), preferably a polyethylene, high-density, closed cell, high-temperature and gasoline-resistant foam material, is positioned between each channel 504 and the respective shoulder 416 to provide a tight fit between the shroud 482 and the fuel tank 412. The fuel line 414 (FIG. 22) includes a fuel filter 506 attached to the end of the fuel line 414 disposed within the fuel tank 412. It should be noted that the extra line shown in FIG. 22 is a purge line. The fuel filter 506 acts as a weight such that during operation of the engine, if the engine is tipped, the weighted fuel line 414 swings to the bottom of the fuel tank 412 to ensure that fuel is picked up by the fuel line 414.

Figure 33:
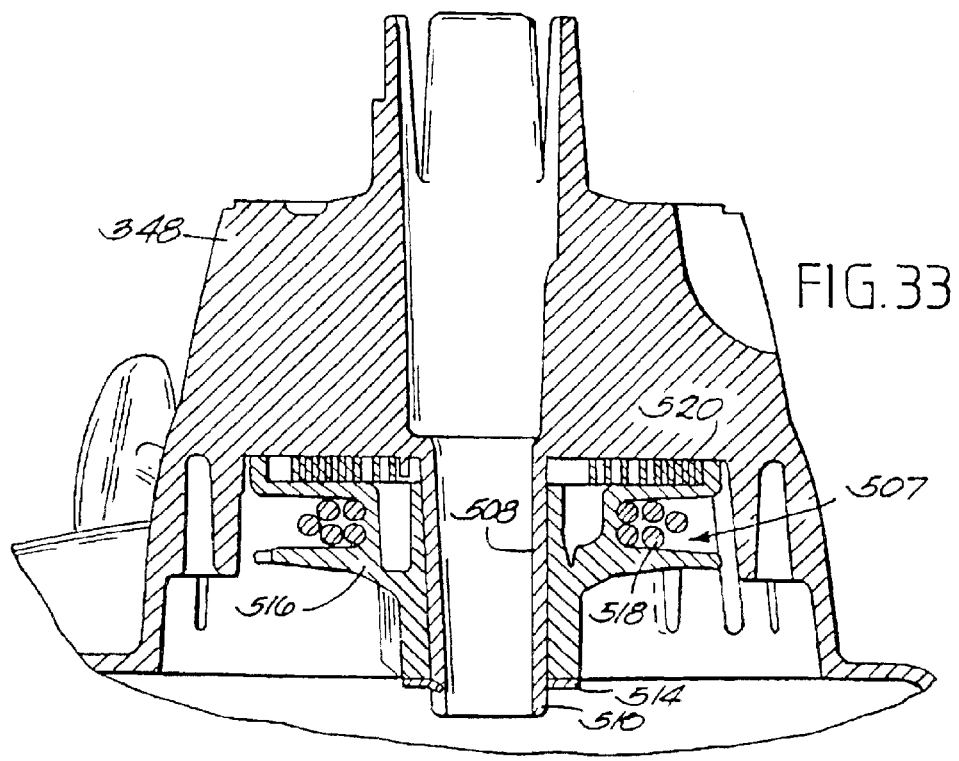
FIG. 33 is an enlarged view of the relationship between the shroud and starter assembly in terms of retaining the starter assembly on the shroud.

Another aspect of the present invention concerns the starter assembly 507 shown in FIG. 33. The blower housing 348 is provided with a hub 508 having an inwardly facing extension 510. The hub 508 is adapted to fit over the crankshaft 392 (FIG. 22) or crankshaft adapter 338 (FIG. 21). The starter assembly 507 which includes the pulley 516, rope 518 and spring 520 is positioned onto the hub 508. A star washer 514 is placed over the hub extension 510 so as to dig into the extension material. The star washer 514 holds the starter assembly 507 in place with respect to the blower housing 348. This arrangement eliminates the need for separate mounting bosses and fasteners typically needed to hold the starter assembly in place. Such mounting bosses and fasteners generally block the cooling air flow by a fan.

FIGS. 34–38 show various views of the pulley 516. The spring 520 (FIG. 33) is positioned on one side 522 of the pulley 516 having an appropriately shaped annular recess 524. The opposite side 526 of the pulley 516 includes a plurality of spokes 528 for engagement with a flywheel such as flywheel 336 shown in FIG. 21. The rope 518 includes a knot 530 on one end thereof which is held in a chamber 532 formed in a hub 534 of the pulley 516 beneath the pulley rope portion 536. The rope 518 extends through a hole 538 in the pulley rope portion 536 and is wrapped around the pulley 516. The other end of the rope 518 is attached to a starter handle 540 (FIG. 20).

The foregoing description of the present invention has been presented for purposes of illustration and description. Furthermore, the description is not intended to limit the invention in the form disclosed herein. Consequently, variations and modifications commensurate with the above teachings in skill or knowledge of the relevant art, are within the scope of the present invention. The embodiments described herein are further intended to explain the best modes known for practicing the invention and to enable others skilled in the art to utilize the invention as such, or other embodiments and with various modifications required by the particular applications or uses of the present invention. It is intended that the appended claims are to be construed to include alternative embodiments to the extent permitted by the prior art.

Various features of the invention are set forth in the following claims.

What is claimed is:

1. A four-stroke internal combustion engine, comprising:
    an engine housing including a crankcase and a cylinder;
    a cylinder head which at least partially defines a combustion chamber, said cylinder head disposed adjacent to said cylinder;
    an intake valve and an exhaust valve disposed within said engine housing;
    a crank chamber disposed within said crankcase;
    an oil reservoir disposed within said crankcase, said oil reservoir being in fluid flow communication with said crank chamber;
    a divider disposed within said crankcase, said divider at least partially dividing said crank chamber and said oil reservoir, said oil reservoir including first and second portions on opposite sides of said crank chamber; and
    a path fluidly connecting said first and second portions, said path allowing lubricant from said oil reservoir to flow around a substantial portion of said divider and to equalized the amount of lubricant in said first and second portions when the engine is inverted.

2. An engine according to claim 1, wherein said divider includes an opening, such that said crank chamber and said oil reservoir are in fluid flow communication through said opening.

3. An engine according to claim 2, wherein said divider further includes a second opening and a third opening, said second opening positioned substantially across from said third opening, said second and third openings being located at predetermined distances from the first opening, such that said crank chamber and said oil reservoir are also in fluid flow communication through said second and third openings.

4. An engine according to claim 1, wherein said engine housing further includes a cylinder side wall which at least partially extends into said crank chamber to define a lubricant receiving space between said divider and said cylinder side wall.

5. An engine according to claim 1, wherein said engine housing further includes a valve chamber in which said intake valve and said exhaust valve are disposed, said valve chamber being in fluid flow communication with said crank chamber.

6. An engine according to claim 1, wherein said engine housing further includes a cylinder side wall which at least partially extends into said crank chamber, and a valve chamber in which said intake valve and said exhaust valve are disposed, said valve chamber being in fluid flow communication with said crank chamber and said cylinder side wall.

7. An engine according to claim 1, further comprising:
    a cantilevered crankshaft having opposite ends, said crankshaft being substantially located within said crank chamber; and
    an agitator located at least partially within said crank chamber, said agitator moving lubricant within said engine housing during operation of said engine, wherein said agitator includes a counterweight which is interconnected with the cantilevered end of said crankshaft, said counterweight including a wing-tipped, aerodynamic side which reduces windage resistance on said crankshaft and which slings the lubricant about said crank chamber as said crankshaft rotates during operation of said engine.

8. An engine according to claim 2, further comprising an agitator located at least partially within said crank chamber, said agitator moving lubricant within said engine housing during operation of said engine, wherein said divider further includes a scraper located adjacent to said opening, said scraper at least partially extending into said crank chamber, such that as said agitator rotates past said scraper during operation of said engine, said scraper meters the amount of lubricant which comes into contact with said agitator.

9. An engine according to claim 8, wherein an end of said scraper is located approximately within the range of 0.020 to 0.060 inches from said agitator when said agitator rotates past said scraper.

10. An engine according to claim 1, further comprising:
    a cantilevered crankshaft substantially disposed within said crank chamber, and
    a cam shaft rotatably driven by said crankshaft, said cam shaft being located substantially normal to said crankshaft.

11. An engine according to claim 10, further comprising:
    a first valve tappet and a second valve tappet each tappet being associated with a respective valve, the valve tappets operatively engaging said cam shaft; and
    wherein the valves are disposed substantially normal to said crankshaft.

12. An engine according to claim 10, wherein said cam shaft has an axial passageway and a radial aperture which communicates with said crank chamber and said passageway, and wherein said engine further comprises:
    a breather tube having opposite ends, one end of said breather tube communicating with said passageway of said cam shaft and the other end of said breather tube communicating with an air intake system of said engine.

13. An engine according to claim 1, wherein said crankcase includes an access hole, and wherein said engine further comprises:
    a cantilevered crankshaft substantially disposed within said crank chamber;
    a piston reciprocally operable within said cylinder, said piston including an aperture;
    a connecting rod having opposite ends, one end of said connecting rod being pivotally attached to said crankshaft, and the other end of said connecting rod being pivotally connected to said piston; and a wrist pin which is received in said aperture of said piston, said wrist pin passing through one end of said connecting rod so as to pivotally connect said connecting rod to said piston, wherein said access hole in said crankcase is aligned with said aperture in said piston during installation of said wrist pin into said piston and through the respective end of said connecting rod.

14. An engine according to claim 1, wherein said engine housing further includes an internal cylinder side wall, and wherein said crank chamber includes at least two bearing pockets, one pocket having a larger diameter than the other, wherein both of said bearing pockets are disposed on the same side of said internal cylinder side wall.

15. An engine according to claim 14, further comprising:
a cantilevered crankshaft having opposite ends, said crankshaft being substantially disposed within said crank chamber;
a first bearing positioned within one bearing pocket and a second bearing positioned in the other bearing pocket, the bearings supporting said crankshaft; and
an agitator located at least partially within said crank chamber, said agitator moving lubricant within said engine housing during operation of said engine, wherein said agitator includes a counterweight which is connected to the cantilevered end of said crankshaft, said counterweight having a locating hole extending therethrough, said counterweight being positioned adjacent to one of the bearings, such that a tool extending at least through said locating hole of said counterweight so as to be evenly positioned around the bearing adjacent to such counterweight for proper insertion of said crankshaft into said crank chamber.

16. An engine according to claim 1, wherein said engine housing further includes a cylindrical side wall which at least partially defines a piston bore, such that said combustion chamber partially covers said piston bore and such that each valve disposed within said engine housing is substantially parallel with said piston bore so that said combustion chamber extends over top portions of the valves, and wherein said engine further comprises:
a spark plug located within said cylinder head, said spark plug positioned such that an electrode of said spark plug is located closer to said exhaust valve than to said intake valve.

17. An engine according to claim 1, wherein said engine housing further includes an internal cylindrical side wall which defines a piston bore and which has a centerline traveling therethrough, and wherein said engine housing also includes additional walls defining draft angles, said draft angles enabling the engine housing to be easily separated from a die.

18. An engine according to claim 1, further comprising:
a cantilevered crankshaft having opposite ends, said crankshaft being substantially disposed in said crank chamber;
a crankshaft pin operably connected to said crankshaft; and
a starter mechanism coupled to said crankshaft pin.

19. An engine according to claim 1, wherein said divider defines a path which extends about said divider, such that the lubricant in said oil reservoir is able to flow around a substantial portion of said divider.

20. An engine according to claim 1, further comprising:
a shroud which at least partially surrounds said engine housing, said shroud including a pair of opposed channels; and a fuel tank having opposed outwardly extending shoulders, such that said shoulders of said fuel tank are received by said respective channels of said shroud.

21. An engine according to claim 20, further comprising:
a filler material positioned between each of said channels of said shroud and each of said respective shoulders of said fuel tank.

22. An engine according to claim 21, wherein said filler material is a polyethylene, high-density, closed cell, high-temperature resistant foam which is also gasoline-resistant.

23. An engine according to claim 1, further comprising:
a fuel tank; and
a fuel line having opposite ends, one end of said fuel line being disposed within said fuel tank, said fuel line further having a fuel filter attached to the end of said fuel line disposed within said fuel tank.

24. An engine according to claim 1, wherein said engine housing further includes a back plate which is adjacent a flywheel, and wherein said crankcase, cylinder and back plate are cast as a single component.

25. An engine according to claim 24, wherein said cylinder includes at least one fin integrally formed thereto, said fin extending from said back plate and beneath said crankcase.

26. An engine according to claim 1, wherein said cylinder includes an intake port and an exhaust port, wherein said intake port and said exhaust port are located on opposite sides of said engine housing, wherein said intake valve and said exhaust valve are in communication with said intake port and said exhaust port, respectively, and wherein said intake port and said exhaust port each have an elliptical shape.

27. An engine according to claim 26, further comprising:
a shroud which at least partially surrounds said engine housing, said shroud having an opening around said intake port; and
an intake isolator having an air/fuel passageway therethrough, said intake isolator mounted to said engine housing such that said air/fuel passageway of said intake isolator is in alignment with said intake port, said intake isolator positioned within said opening in said shroud.

28. An engine according to claim 27, wherein said intake isolator includes an integrally formed back wall and side wall, wherein said back wall is adjacent said intake port and said side wall is substantially normal to said back wall.

29. An engine according to claim 27, further comprising:
a carburetor which is interconnected with said intake isolator.

30. An engine according to claim 26, further comprising:
a muffler connected to said engine housing, wherein said muffler includes a boss which extends into said exhaust port.

31. An engine according to claim 30, wherein said engine housing includes an angled, step sealing surface located in said exhaust port, such that an end of said boss of said muffler mates against said sealing surface of said exhaust port.

32. An engine according to claim 31, further comprising:
a sealing gasket located between said end of said boss and said sealing surface of said exhaust port.

33. An engine according to claim 30, wherein said boss of said muffler is surrounded by an outer portion of said exhaust port to define a clearance space between said muffler and said engine housing, and wherein said engine further comprises:

a gasket positioned between said engine housing and said muffler to seal said clearance space.

34. An engine according to claim 33, wherein said gasket is enlarged, and wherein the enlarged gasket provides a heat shield.

35. An engine according to claim 30, wherein said muffler includes a pair of outer shells having a pair of mounting bolt holes extending therethrough for receiving a pair of mounting bolts.

36. An engine according to claim 35, wherein said muffler includes an inner shell sandwiched between said pair of outer shells, said inner shell including a pair of mounting bolt holes extending therethrough for receiving the mounting bolts.

37. An engine according to claim 33, wherein one of the outer shells includes a shoulder extending around an edge of the outer shell, and the other outer shell includes a hook shaped flange extending around an edge of the outer shell, such that said hook shaped flange of the respective outer shell receives said shoulder of the respective outer shell.

38. An engine according to claim 1, further comprising:
a shroud which at least partially surrounds said engine housing, and wherein said shroud includes a plurality of raised portions on one side thereof.

39. A four-stroke internal combustion engine adapted for assembly on an assembly fixture, said engine comprising:
an engine housing including an integrally formed crankcase, cylinder and flywheel back plate, said flywheel back plate including a mounting boss on one side thereof such that a pin of the assembly fixture is received by said mounting boss; and
a shroud which at least partially surrounds said engine housing, said shroud including a slot therein, such that said slot surrounds the pin of the assembly fixture when said shroud is positioned around said engine, and such that the pin can be removed from said mounting boss after said shroud is attached to said engine, said engine being substantially completely assembled while said engine housing is mounted to the assembly fixture.

40. A four-stroke internal combustion engine, comprising:
an engine housing having an oversized wrist pin boss, said boss being machinable to include at least a first aperture in one location and a second aperture in another location;
a cantilevered crankshaft disposed within said engine housing;
a piston reciprocally operable within said engine housing, said piston including an aperture;
a connecting rod having opposite ends, one end of said connecting rod being pivotally attached to said crankshaft, and the other end of said connecting rod being pivotally connectable to said piston; and
a wrist pin which is passable through said first aperture in said boss into said aperture of said piston and into one end of said connecting rod to pivotally connect said connecting rod to said piston to provide a first throw of said engine, and which is also passable through said second aperture of said boss into said aperture of said piston and into one end of said connecting rod to pivotally connect said connecting rod to said piston to provide a second throw of said engine.

41. A four-stroke internal combustion engine comprising:
a crankshaft;
a blower housing having a hub which includes an extension, said hub adapted to fit over said crankshaft;

a starter assembly surrounded by said blower housing and positioned onto said hub extension, said starter assembly adapted to cooperate with said crankshaft to start the engine; and
an annular ring positioned over said extension to prevent axial movement of said starter assembly.

42. A method of assembling a four-stroke internal combustion engine, comprising the steps:
providing an engine housing having an integrally formed crankcase, cylinder and flywheel back plate;
providing a mounting boss on said back plate;
mounting said engine to an assembly fixture by positioning a pin on the fixture into said mounting boss;
placing a shroud around said engine housing while said engine remains mounted to said fixture; and
attaching said shroud to said engine housing while said engine remains mounted to the assembly fixture.

43. An engine according to claim 12, further comprising:
a check valve positioned between said cam shaft and said air intake system of said engine.

44. An engine according to claim 40, further comprising:
a star washer which is positioned adjacent to one end of said wrist pin and which is positioned in said aperture of said piston to prevent axial movement of said star washer.

45. An engine according to claim 39, wherein said flywheel back plate further includes a second mounting boss on an opposite side thereof, such that a second pin of the assembly fixture is received by said second mounting boss, and wherein said shroud further includes a second slot therein, such that said second slot surrounds the second pin of the assembly fixture when said shroud is positioned around said engine, and such that the second pin can be removed from said second mounting boss after said shroud is attached to said engine.

46. A four-stroke internal combustion engine, comprising:
an engine housing including a crankcase and a cylinder;
a crank chamber disposed within said crankcase;
a crankshaft supported for rotation within said crank chamber;
a piston operably interconnected with said crankshaft for reciprocation within said cylinder in response to rotation of said crankshaft;
an oil reservoir disposed within said crankcase, and in fluid flow communication with said crank chamber;
an arcuate divider at least partially separating said crank chamber from said oil reservoir; and
a depending wall extending at least partially into said crank chamber to define a lubricant receiving space between said divider and said depending wall.

47. An engine as set forth in claim 46, wherein said divider includes an opening, such that said crank chamber and said oil reservoir are in fluid flow communication through said opening.

48. An engine as set forth in claim 47, wherein said divider further includes a second opening and a third opening, said second opening positioned substantially across from said third opening, said crank chamber and said oil reservoir being in fluid flow communication through said second and third openings.

49. An engine as set forth in claim 46, wherein said depending wall is a cylinder side wall.

50. An engine as set forth in claim 46, further comprising an intake valve and an exhaust valve disposed within the engine housing to the side of the cylinder, wherein said engine housing further includes a valve chamber in which said intake valve and said exhaust valve are disposed, said valve chamber being in fluid flow communication with said crank chamber.

51. An engine according to claim 46, further comprising:
a cam shaft rotatably driven by said crankshaft and oriented substantially normal with respect to said crankshaft.

52. An engine according to claim 51, further comprising first and second valve tappets associated with a respective valve and operatively engaging said cam shaft, wherein said valves are disposed substantially normal to said crankshaft.

53. An engine according to claim 51, wherein said cam shaft has an axial passageway and a radial aperture communicating between said crank chamber and said passageway, said engine further comprising a breather tube having one end communicating with said passageway of said cam shaft and another end communicating with an air intake system of said engine.

54. An engine according to claim 46, wherein said crankshaft is cantilevered, said crankcase includes an access hole, said piston includes an aperture, said access hole and aperture being alignable during assembly of said engine;
and wherein said engine further comprises:
a connecting rod having one end pivotally attached to said crankshaft and the other end pivotally connected to said piston; and
a wrist pin insertable through said access hole and into said aperture in said piston to pivotally connect said connecting rod to said piston.

55. An engine according to claim 46, wherein said crank chamber includes at least two bearing pockets, one pocket having a larger diameter than the other and both pockets being disposed on the same side of said depending wall.

56. An engine according to claim 46, further comprising a shroud at least partially surrounding said engine housing and including a pair of opposed channels, and a fuel tank having opposed outwardly-extending shoulders, such that said shoulders of said fuel tank are received by said respective channels of said shroud.

57. An engine according to claim 46, wherein said engine housing further includes a back plate which is adjacent to a flywheel, and wherein said crankcase, cylinder, and back plate are cast as a single component.

58. An engine according to claim 46, wherein said cylinder includes elliptical intake and exhaust ports on opposite sides of said engine housing, and intake and exhaust valves in communication with said intake and exhaust ports, respectively.

59. An engine as set forth in claim 46, wherein the divider is substantially U-shaped.

60. An engine as set forth in claim 59, wherein one side of the divider is exposed to the oil reservoir and an opposite side of the divider is exposed to the crank chamber.

61. The engine of claim 46, wherein said cylinder defines a bore having a bore axis, and wherein said depending wall extends into said crank chamber generally parallel to said bore axis.

62. The engine of claim 46, wherein said cylinder defines a bore, and wherein said depending wall defines an extension of said cylinder bore into said crank chamber.

63. The engine of claim 62, wherein said bore extension and said cylinder bore have substantially the same diameter.

64. The engine of claim 63, wherein said bore extension and said cylinder bore are substantially coaxial with each other.

65. The engine of claim 46, further comprising a cylinder head mounted to said engine housing over said cylinder to at least partially define a combustion chamber in said cylinder, and intake and exhaust valves disposed within said engine housing.

66. A four-stroke internal combustion engine, comprising:
an engine housing; including a crankcase and a cylinder;
a crankshaft supported for rotation within said crank chamber;
a wrist pin boss on said engine housing, said wrist pin boss being large enough to permit an access hole to be machined thereinto at one of at least two locations;
a piston reciprocally operable within said cylinder, said piston including an aperture, said access hole and aperture being alignable during assembly of said engine;
a connecting rod having one end pivotally attached to said crankshaft and the other end pivotally connected to said piston; and
a wrist pin insertable through said access hole and into said aperture in said piston to pivotally connect said connecting rod to said piston;
wherein the location of the access hole in the wrist pin boss is selected to accommodate a desired connecting rod length.

67. A four-stroke engine capable of being operated in a tipped position, said engine comprising:
an engine housing, including a crankcase and a cylinder, said crankcase including a reservoir adapted to contain a lubricant;
a combustion chamber at least partially defined by said cylinder;
intake and exhaust valves communicating with said combustion chamber;
a piston reciprocal within said cylinder;
a crankshaft supported for rotation within said crank chamber and connected with said piston to convert linear movement of said piston into rotation of said crankshaft, said crankshaft supported by a bearing;
a cam shaft oriented normal to said crankshaft and rotatable in response to rotation of said crankshaft to actuate said valves; and
a crank chamber disposed within said crankcase, wherein said cam shaft has an axial passageway and a radial aperture which communicates with said crank chamber and said passageway, the cam shaft receiving lubricant from the reservoir through said bearing.

68. A four-stroke internal combustion engine, comprising:
an engine housing, including a crankcase and a cylinder;
a crank chamber disposed within said crankcase; and
a cantilevered crankshaft supported for rotation within said crank chamber, said crankshaft including a counterweight having a locating hole extending therethrough to accommodate a tool for proper insertion of said crankshaft into said crank chamber.

69. The engine of claim 68, further comprising an internal cylinder side wall, and wherein said crank chamber includes at least two bearing pockets, one pocket having a larger diameter than the other, wherein both of said bearing pockets are disposed on the same side of said internal cylinder side wall.

70. A four-stroke internal combustion engine, comprising:
an engine housing, including a crankcase and a cylinder;
a crank chamber disposed within said crankcase;

a crankshaft supported for rotation within said crank chamber;

a piston operably interconnected with said crankshaft for reciprocation within said cylinder in response to rotation of said crankshaft;

a shroud at least partially surrounding said engine housing and including a pair of opposed channels; and a fuel tank having opposed outwardly-extending shoulders, such that said shoulders of said fuel tank are received by said respective channels of said shroud.

71. The engine of claim 70, further comprising:

an oil reservoir, disposed within said crankcase and in fluid flow communication with said crank chamber;

a divider at least partially separating said crank chamber from said oil reservoir; and a depending wall extending at least partially into said crank chamber to define a lubricant receiving space between said divider and said depending wall.

72. The engine of claim 70, further comprising a filler material positioned between each of said channels and said shroud and each of said respective shoulders of said fuel tank.

73. The engine of claim 72, wherein said filler material is a polyethylene, high-density, closed cell, high-temperature resistant foam which is also gasoline-resistant.

74. A four-stroke internal combustion engine, comprising:

an engine housing including a crankcase, a cylinder, and a back plate;

a flywheel adjacent to said back plate;

a crank chamber disposed within said crankcase;

a crankshaft supported for rotation within said crank chamber; and a piston operably interconnected with said crankshaft for reciprocation within said cylinder in response to rotation of said crankshaft;

wherein said crankcase, cylinder, and back plate are cast as a single component.

75. The engine of claim 74, further comprising:

an oil reservoir disposed within said crankcase, and in fluid flow communication with said crank chamber;

a divider at least partially separating said crank chamber from said oil reservoir, and a depending wall extending at least partially into said crank chamber to define a lubricant receiving space between said divider and said depending wall.

76. The engine of claim 75, wherein said cylinder includes at least one fin integrally formed therewith, said fin extending from said back plate and beneath said crankcase.

77. An L-head, internal combustion engine, comprising:

an engine housing including a crankcase and a cylinder, said cylinder including intake and exhaust ports on opposite sides of said engine housing, the intake and exhaust ports being elliptical in a cross-section taken perpendicular to the longitudinal axis of each respective port;

intake and exhaust valves in communication with said intake and exhaust ports, respectively;

a crank chamber disposed within said crankcase;

a crankshaft supported for rotation within said crank chamber; and a piston operably interconnected with said crankshaft for reciprocation within said cylinder in response to rotation of said crankshaft.

78. The engine of claim 77, further comprising:

an oil reservoir disposed within said crankcase, and in fluid flow communication with said crank chamber;

a divider at least partially separating said crank chamber from said oil reservoir; and a depending wall extending at least partially into said crank chamber to define a lubricant receiving space between said divider and said depending wall.

79. The engine of claim 77, further comprising:

a shroud which at least partially surrounds said engine housing, said shroud having an opening around said intake port; and an intake isolator having an air/fuel passageway therethrough, said intake isolator mounted to said engine housing such that said air/fuel passageway of said intake isolator is in alignment with said intake port, said intake isolator positioned within said opening in said shroud.

80. The engine of claim 77, wherein said intake isolator includes an integrally-formed back wall and side wall, wherein said back wall is adjacent said intake port and said side wall is substantially normal to said back wall.

81. The engine of claim 77, further comprising a carburetor which is interconnected with said intake isolator.

82. The engine of claim 77, further comprising a muffler connected to said engine housing, wherein said muffler includes a boss which extends into said exhaust port.

83. The engine of claim 82, wherein said engine housing includes an angled, step sealing surface located in said exhaust port, such that an end of said boss of said muffler mates against said sealing surface of said exhaust port.

84. The engine of claim 83, further comprising a sealing gasket located between said end of said boss and said sealing surface of said exhaust port.

85. The engine of claim 82, wherein said boss of said muffler is surrounded by an outer portion of said exhaust port to define a clearance space between said muffler and said engine housing, and wherein said engine further comprises a gasket positioned between said engine housing and said muffler to seal said clearance space.

86. The engine of claim 85, wherein said gasket is enlarged and provides a heat shield.

87. The engine of claim 82, wherein said muffler includes a pair of outer shells having a pair of mounting bolt holes extending therethrough for receiving a pair of mounting bolts.

88. The engine of claim 87, wherein said muffler includes an inner shell sandwiched between said pair of outer shells, said inner shells including a pair of mounting bolt holes extending therethrough for receiving the mounting bolts.

89. The engine of claim 85, wherein one of the outer shells includes a shoulder extending around an edge of the outer shell, and the other outer shell includes a hook shaped flange extending around an edge of the outer shell, such that said hook shaped flange of the respective outer shell receives said shoulder of the respective outer shell.

90. The engine of claim 67, wherein said crankshaft includes a worn-helical gear.

91. The engine of claim 90, wherein said cam shaft includes a worm-helical gear, and wherein said worm-helical gear of said crankshaft meshes with said worm-helical gear of said cam shaft during operation of the engine.

92. The engine of claim 90, wherein said radial aperture extends through said worm-helical gear of said cam shaft.

93. The engine of claim 92, wherein said engine housing includes a valve chamber and an aperture which communicates with said valve chamber and said crank chamber, said aperture being positioned adjacent to said worm-helical gear of said cam shaft such that rotation of said worm-helical gear of said cam shaft directs lubricant through said aperture and into said valve chamber.

94. The engine of claim 68, herein said crankshaft includes a first end and a second end, said first end including said counterweight, and wherein said engine further comprises a first bearing positioned on said crankshaft adjacent said counterweight, a second bearing positioned on said crankshaft near said second end; a gear positioned on said crankshaft between said first and second bearings, and a cam shaft supported for rotation by said engine housing, said cam shaft including a gear in mating engagement with said gear of said crankshaft.

* * * * *